(12) United States Patent
Mangnall et al.

(10) Patent No.: US 11,340,868 B2
(45) Date of Patent: May 24, 2022

(54) EXECUTION UNIT FOR EVALUATING FUNCTIONS USING NEWTON RAPHSON ITERATIONS

(71) Applicant: Graphcore Limited, Bristol (GB)

(72) Inventors: Jonathan Mangnall, Portishead (GB); Stephen Felix, Bristol (GB)

(73) Assignee: Graphcore Limited, Bristol (GB)

( * ) Notice: Subject to any disclaimer, the term of this patent is extended or adjusted under 35 U.S.C. 154(b) by 250 days.

(21) Appl. No.: 16/395,502

(22) Filed: Apr. 26, 2019

(65) Prior Publication Data
US 2020/0293278 A1  Sep. 17, 2020

(30) Foreign Application Priority Data

Mar. 11, 2019  (GB) ..................................... 1903348

(51) Int. Cl.
*G06F 7/483* (2006.01)
*G06F 7/535* (2006.01)
(Continued)

(52) U.S. Cl.
CPC ............... *G06F 7/483* (2013.01); *G06F 1/03* (2013.01); *G06F 7/535* (2013.01); *G06F 7/5525* (2013.01);
(Continued)

(58) Field of Classification Search
CPC ............. G06F 2101/08; G06F 2101/12; G06F 2207/5354–5356; G06F 2207/5521; G06F 2207/5526; G06F 7/5525; G06F 1/03
See application file for complete search history.

(56) References Cited

U.S. PATENT DOCUMENTS 5,341,321 A  *  8/1994  Karp ....................... G06F 7/535
                                                                 708/500
5,619,439 A       4/1997  Yu et al.
(Continued)

FOREIGN PATENT DOCUMENTS

EP          0154182 A2     9/1985
EP           226179 A1     6/1987

OTHER PUBLICATIONS

Takagi N, Proceedings of the 13th Symposium on Computer Arithmetic, 1997, pp. 126-131, ISBN 978-0-8186-7846-2, "Generating a Power of an Operand by a Table Look-up and a Multiplication", Nagoya Japan.

(Continued)

*Primary Examiner* — Matthew D Sandifer
(74) *Attorney, Agent, or Firm* — Haynes and Boone, LLP

(57) ABSTRACT

An execution unit for a processor, the execution unit comprising: a look up table having a plurality of entries, each of the plurality of entries comprising an initial estimate for a result of an operation; a preparatory circuit configured to search the look up table using an index value dependent upon the operand to locate an entry comprising a first initial estimate for a result of the operation; a plurality of processing circuits comprising at least one multiplier circuit; and control circuitry configured to provide the first initial estimate to the at least one multiplier circuit of the plurality of processing circuits so as perform processing, by the plurality of processing units, of the first initial estimate to generate the function result, said processing comprising applying one or more Newton Raphson iterations to the first initial estimate.

21 Claims, 18 Drawing Sheets

(51) Int. Cl.
  *G06F 7/552* (2006.01)
  *G06F 1/03* (2006.01)
(52) U.S. Cl.
  CPC .. *G06F 2101/12* (2013.01); *G06F 2207/5355* (2013.01); *G06F 2207/5356* (2013.01)

(56) References Cited

U.S. PATENT DOCUMENTS

| | | | |
|---|---|---|---|
| 5,926,406 | A | 7/1999 | Tucker et al. |
| 6,976,154 | B1 | 12/2005 | Dyckerhoff et al. |
| 11,029,962 | B2 | 6/2021 | Mangnall |
| 11,106,432 | B2 | 8/2021 | Mangnall et al. |
| 11,119,733 | B2 | 9/2021 | Mangnall |
| 2006/0064454 | A1* | 3/2006 | Wang .............. G06F 1/035 708/651 |
| 2006/0184594 | A1* | 8/2006 | Lutz .............. G06F 7/535 708/200 |
| 2007/0061389 | A1 | 3/2007 | Hussain |
| 2010/0198894 | A1 | 8/2010 | Azadet |
| 2010/0198895 | A1 | 8/2010 | Azadet |
| 2014/0149721 | A1 | 5/2014 | Panteleev |
| 2015/0106598 | A1 | 4/2015 | Kahlich |
| 2015/0363169 | A1* | 12/2015 | Alvarez-Heredia .... G06F 7/535 708/209 |
| 2016/0110163 | A1* | 4/2016 | Rarick .............. G06F 7/5525 708/503 |
| 2016/0364209 | A1 | 12/2016 | Nystad |
| 2017/0109134 | A1* | 4/2017 | Van Benthem ....... G06F 7/5525 |
| 2021/0294610 | A1 | 9/2021 | Mangnall |

OTHER PUBLICATIONS

Wires K et al. The Journal of VLSI Signal Processing, vol. 42, N 3, pp. 257-272, 2006, doi: 10.1007/sl1265-006-4186-0, "Reciprocal and Reciprocal Square Root Units with Operand Modification and Multiplication". The Netherlands.

Chen D et al., IEEE Canadian Conference on Electrical and Computer Engineering, 2007, pp. 1094-1097, ISBN 1-4244-1021-5, "Design and Implementation of Decimal Reciprocal Unit".

Wang, et al., The Journal of VLSI Signal Processing, vol. 49, Nr 1, pp. 3-8, 2007, doi:10.1007/sl1265-007-0058-5, "A Decimal Floating—Point Divider Using Newton-Raphson Iteration". U.S.

Kabuo H, et al., IEEE Transactions on Computers, vol. 43, pp. 43-51, 1994, doi: 10.I109/12.250608, "Accurate rounding scheme for the Newton-Raphson method using redundant binary representation". Osaka, Japan.

Combined Search and Examination Report for GB Patent Application No. GB1903348.9 dated Sep. 17, 2019. 9 pages.

Examination Report dated Dec. 18, 2020 for United Kingdom Patent Application No. GB1903348.9. 7 pages.

Combined Search and Examination Report for Patent Application No. GB1903347.1 dated Sep. 17, 2019.

Combined Search and Examination Report for Patent Application No. GB1903344.8 dated Sep. 5, 2019.

Combined Search and Examination Report for Patent Application No. GB1903346.3 dated Sep. 17, 2019.

WEY, Proceedings of the 6th WSEAS International Conference on Instrumentation, Measurements, Circuits & Systems, Hangzhou, China, Apr. 15, 2007, pp. 181-185, "A pipelined Divider with a Small Lookup Table" available from https://www.researchgate.net/profile/Woo_Chan_Park/publication/3966737_A_new_pipelined_divider_with_a_small_lookup_table/links/54cflc 500c:t29ca810fd844d/A-new-pipelined-divider-with-a-small-lookup-table.pdf.

Jeong, IEEE Transactions on Computers, vol. 53, No. 4, pp. 489-495, Feb. 26, 2004, ISBN 0-7803-7363-4 Jeong J-C et al, "A Cost-Effective Pipelined Divider with a Small Lookup Table".

Singh, SB; IEEE—17th International Conference on Application-specific Systems, Architectures and Processors ASAP 06, Sep. 11, 2006, ISBN 0-7695-2682-9, "A cost effective Pipelined Divider for Double Precision Floating Point Number".

\* cited by examiner

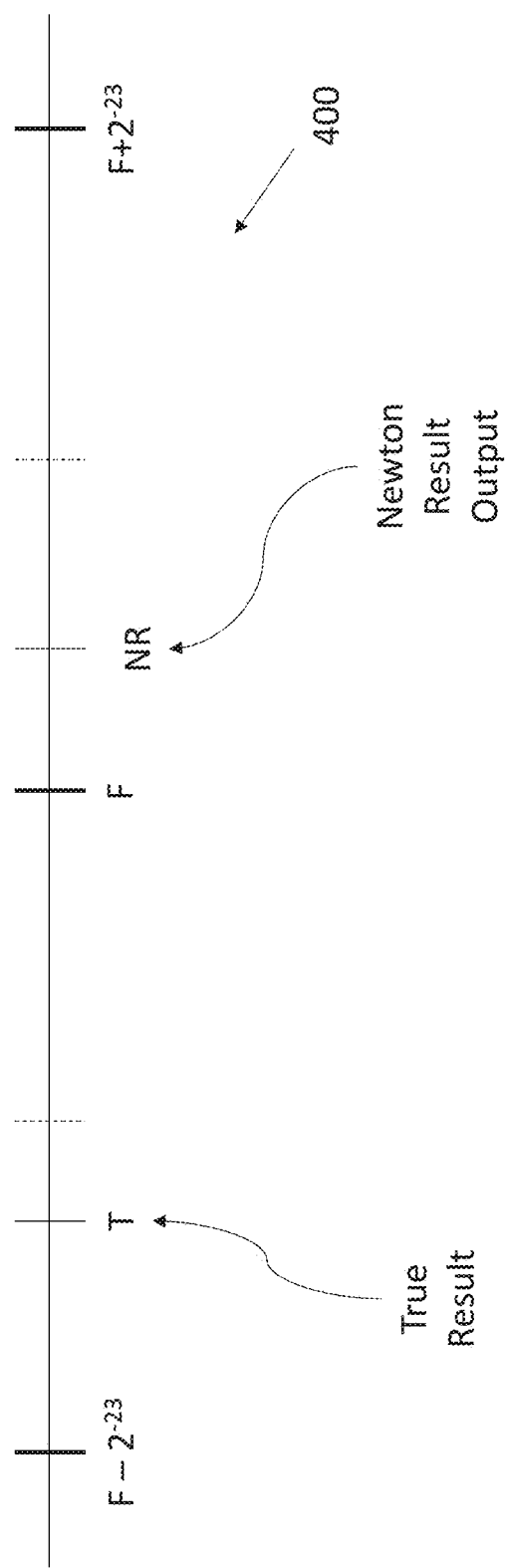

US 11,340,868 B2

EXECUTION UNIT FOR EVALUATING FUNCTIONS USING NEWTON RAPHSON ITERATIONS

CROSS-REFERENCE TO RELATED APPLICATIONS

This application claims the priority benefit under 35 U.S.C. § 119 of United Kingdom Patent Application No. 1903348.9, filed Mar. 11, 2019, the entire contents of which are incorporated herein by reference.

TECHNICAL FIELD

The present disclosure relates to an execution unit of a processor. The disclosure relates particularly to an execution unit configured to evaluate functions using at least one multiplier circuit.

BACKGROUND

In computing, bit sequences of predefined sizes are used to represent numbers. The particular representation of the bit sequence determines how a bit sequence is interpreted.

One form of representation is the floating-point representation, which is often used to approximately represent real numbers. The floating-point representation comprises 3 separate components, i.e. a sign component, a mantissa component, and an exponent component. In the single-precision (i.e. 32-bit) floating point representation according to the IEEE 754 standard, the sign component consists of a single bit, the exponent consists of 8 bits, and the mantissa consists of 23 bits. In the half-precision (i.e. 16-bit) floating-point representation, the sign component consists of a single bit, the mantissa consists of 10 bits, and the exponent consists of 5 bits. In most cases, a number is given from these 3 components by the following formula:

$$(-1)^{signbit} X\, 1.\text{mantissa}\, X2^{exponentbits-offset}$$

The "offset" to the exponent is dependent upon the number of bits used to represent the exponent, which is dependent upon the precision level. In the single-precision representation, the offset is equal to 127. In the half-precision format, the offset is equal to 15.

Here "1" is an implicit bit, which is derived from the exponent. In the case that the exponent bit sequence consists of anything other than all zeros or all ones, the implicit bit is equal to one and the number is known as a "Norm". In this case, the floating point number is given by:

$$(-1)^{signbit} X\, 1.\text{mantissa}\, X2^{exponentbits-offset}$$

In the case that the exponent bit sequence consists of all zeros, the implicit bit is equal to zero and the number is known as a "denorm". In this case, the floating point number is given by:

$$(-1)^{signbit} X\, 0.\text{mantissa}\, X2^{exponentbits-offset}$$

The denorms are useful, since they allow smaller numbers to be represented than would otherwise be representable by the limited number of exponent bits.

The other circumstance—in which the exponent bit sequence consists of all ones—may be used to represent special cases, e.g. ±infinity or NaN (not a number). NaN is a numeric data type value representing an undefined or unrepresentable value. The presence of a NaN in the results of a calculation is often taken to signal an exception.

Another form of representation is the integer representation. The integer may be signed, in which case a single bit of the bit sequence is used to represent the sign of the number, with the remaining bits of the bit sequence used to represent the magnitude of the number. Alternatively, the integer may be unsigned, in which case all of the bits of the bit sequence are used to represent the magnitude of the number.

The floating point representation may be used to represent numbers in implementations of neural network processing. An implementation of neural networks involves the storage and manipulation of such floating point numbers. Neural networks are used in the field of machine learning and artificial intelligence. Neural networks comprise arrangements of sets of nodes which are interconnected by links and which interact with each other. The principles of neural networks in computing are based on information about how electrical stimuli convey information in the human brain. For this reason, the nodes are often referred to as neurons. They may also be referred to as vertices. The links are sometimes referred to as edges. The network can take input data and certain nodes of the network can perform operations on the data. The results of these operations are passed to other nodes. The output of each node is referred to as its activation or node value. Each link is associated with a weight. A weight defines the connectivity between nodes of the neural network. Many different techniques are known by which neural networks are capable of learning. The learning takes place by altering values of the weights.

FIG. 1 shows an extremely simplified version of one arrangement of nodes in a neural network. This type of arrangement is often used in learning or training and comprises an input layer of nodes, a hidden layer of nodes and an output layer of nodes. In reality, there will be many nodes in each layer, and nowadays there may be more than one layer per section. Each node of the input layer Ni is capable of producing at its output an activation or node value which is generated by carrying out a function on data provided to that node. A vector of node values from the input layer is scaled by a vector of respective weights at the input of each node in the hidden layer, each weight defining the connectivity of that particular node with its connected node in the hidden layer. In practice, networks may have millions of nodes and be connected multi-dimensionally, so the vector is more often a tensor. The weights applied at the inputs of the node Nh are labelled w0 . . . w2. Each node in the input layer is connected at least initially to each node in the hidden layer. Each node in the hidden layer can perform an activation function on the data which is provided to them and can generate similarly an output vector which is supplied to each of the nodes No in the output layer No. Each node weights its incoming data, for example by carrying out the dot product of the input activations of the node and its unique weights for the respective incoming links. It then performs an activation function on the weighted data. The activation function can be for example a sigmoid. See FIG. 1A. The network learns by operating on data input at the input layer, assigning weights to the activations from each node and acting on the data input to each node in the hidden layer (by weighting it and performing the activation function). Thus, the nodes in the hidden layer operate on the weighted data and supply outputs to the nodes in the output layer. Nodes of the output layer may also assign weights. Each weight is characterised by a respective error value. Moreover, each node may be associated with an error condition. The error condition at each node gives a measure of whether the error in the weight of the node falls below a certain level or degree of acceptability. There are different learning approaches, but in each case there is a forward propagation through the network from left to right in FIG. 1, a calculation of overall error, and a backward propagation from right to left in FIG. 1 through the network of the error. In the next cycle, each node takes into account the back-propagated error and produces a revised set of weights. In this way, the network can be trained to perform its desired operation.

Certain well known functions, such as divide, exponential, logarithm and square root, may have applications in neural network processing. A problem with which this present application is concerned is how to provide a suitable execution unit configured to generate values for one or more of such functions quickly and accurately, and preferably in a manner which optimises the use of processing resources.

SUMMARY

According to a first aspect, there is provided an execution unit for a processor, the execution unit configured to receive from a computer readable instruction an op code defining the nature of the instruction and to access one or more operands defined by the instruction, wherein the op code defines that the instruction evaluates a function of one or more operands to produce a function result, the operand being a number in floating point format, the execution unit comprising: a look up table having a plurality of entries, each of the plurality of entries comprising an initial estimate for a result of an operation; a preparatory circuit configured to search the look up table using an index value dependent upon the operand to locate an entry of the plurality of entries comprising a first initial estimate for a result of the operation when performed on at least one of the one or more operands; a plurality of processing circuits comprising at least one multiplier circuit configured to multiply together two or more input values to generate at least one multiplication result; and control circuitry configured to provide the first initial estimate to the at least one multiplier circuit of the plurality of processing circuits so as perform processing, by the plurality of processing units, of the first initial estimate to generate the function result, said processing comprising applying one or more Newton Raphson iterations to the first initial estimate.

In some embodiments, the plurality of processing circuits comprises one or more of: an addition circuit configured to add together two or more input values to generate an addition result; and a subtraction circuit configured to perform a subtraction using one or more input values to generate a subtraction result.

In some embodiments, said processing comprises: determining a preliminary function result from the one or more Newton Raphson iterations; performing a reversal of the function to determine an error in the preliminary function result; and performing rounding of one or more bits of the preliminary function result in dependence upon the determined error.

In some embodiments, the processing comprises applying one or more Newton Raphson iterations to the first initial estimate to determine an estimate of improved precision for the result of the operation on the at least one of the one or more operands, wherein the processing comprises processing the estimate of improved precision to generate the function result.

In some embodiments, the function is a divide function and the at least one operand comprises a numerator and denominator of the divide function.

In some embodiments, the index value comprises at least part of the denominator.

In some embodiments, the first initial estimate is an estimate of the reciprocal of the denominator.

In some embodiments, the at least one multiplier is configured to perform the processing of the estimate of improved precision to generate the function result by multiplying the estimate of improved precision by the numerator.

In some embodiments, the function is a square root function of a first operand of the at least one operand.

In some embodiments, the index value comprises at least part of the first operand.

In some embodiments, the first initial estimate is an estimate of the reciprocal of the square root of the first operand.

In some embodiments, the at least one multiplier is configured to perform the processing of the estimate of improved precision to generate the function result by multiplying the estimate of improved precision by the first operand.

According to a second aspect, there is provided a method of operating an execution unit in a processor, the method comprising: receiving from a computer readable instruction, an op code defining the nature of the instruction; accessing one or more operands defined by the instruction, wherein the op code defines that the instruction evaluates a function of one or more operands to produce a function result, the operand being a number in floating point format; storing, in a look up table, a plurality of entries, each of the plurality of entries comprising an initial estimate for a result of an operation; searching the look up table using an index value dependent upon the operand to locate an entry of the plurality of entries comprising a first initial estimate for a result of the operation when performed on at least one of the one or more operands; multiplying together at at least one multiplier circuit of a plurality of processing circuits, two or more input values to generate at least one multiplication result; and providing the first initial estimate to the at least one multiplier circuit of the plurality of processing circuits so as perform processing, by the plurality of processing units, of the first initial estimate to generate the function result, said processing comprising applying one or more Newton Raphson iterations to the first initial estimate.

In some embodiments, the method comprising: adding together at an addition circuit of the plurality of processing circuits, two or more input values to generate an addition result; subtracting at a subtraction circuit of the plurality of processing circuits using one or more input values to generate a subtraction result.

In some embodiments, said processing comprises: determining a preliminary function result from the one or more Newton Raphson iterations; performing a reversal of the function to determine an error in the preliminary function result; and performing rounding of one or more bits of the preliminary function result in dependence upon the determined error.

In some embodiments, the processing comprises applying one or more Newton Raphson iterations to the first initial estimate to determine an estimate of improved precision for the result of the operation on the at least one of the one or more operands, wherein the processing comprises processing the estimate of improved precision to generate the function result.

In some embodiments, the function is a divide function and the at least one operand comprises a numerator and denominator of the divide function.

In some embodiments, the index value comprises at least part of the denominator.

In some embodiments, the first initial estimate is an estimate of the reciprocal of the denominator.

In some embodiments, comprising performing the processing of the estimate of improved precision to generate the function result by multiplying the estimate of improved precision by the numerator.

In some embodiments, the function is a square root function of a first operand of the at least one operand.

In some embodiments, the index value comprises at least part of the first operand.

In some embodiments, the first initial estimate is an estimate of the reciprocal of the square root of the first operand.

In some embodiments, performing the processing of the estimate of improved precision to generate the function result by multiplying the estimate of improved precision by the first operand.

BRIEF DESCRIPTION OF THE DRAWINGS

Some embodiments will now be described by way of example only with reference to the accompanying figures in which:

FIG. 4 illustrates a number line of floating point numbers;

DETAILED DESCRIPTION

The present disclosure concerns an execution unit configured to evaluate functions. The unit comprises a plurality of multipliers that are interconnectable to efficiently operate in a pipelined manner. The following description explains various embodiments of the application in further detail. The techniques described herein can be used with the intelligence processing units (IPUs) described in our earlier U.S. application Ser. No. 15/885,925, the contents of which are herein incorporated by reference. Such an IPU comprises a plurality of tiles (only one of which is shown herein) interconnected by a switching fabric to form a chip. Such chips can be connected together using links on the chip to form a multi-chip processor.

Figure 1:
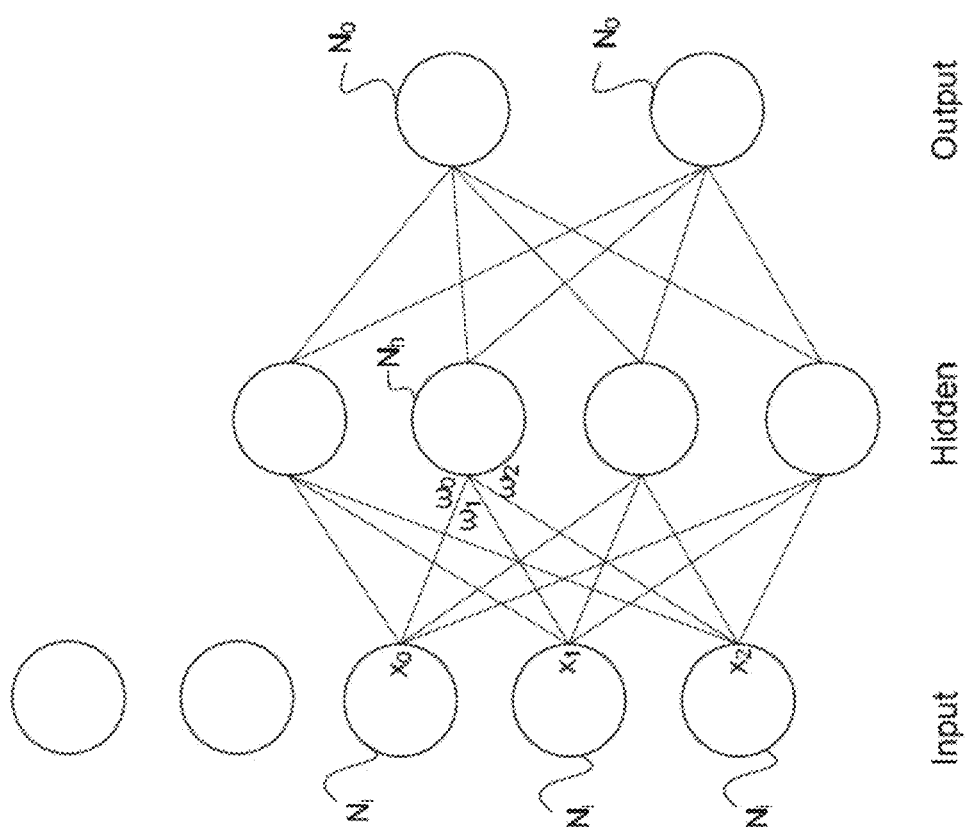
FIG. 1 is a highly simplified schematic view of a neural net.
Figure 1A:
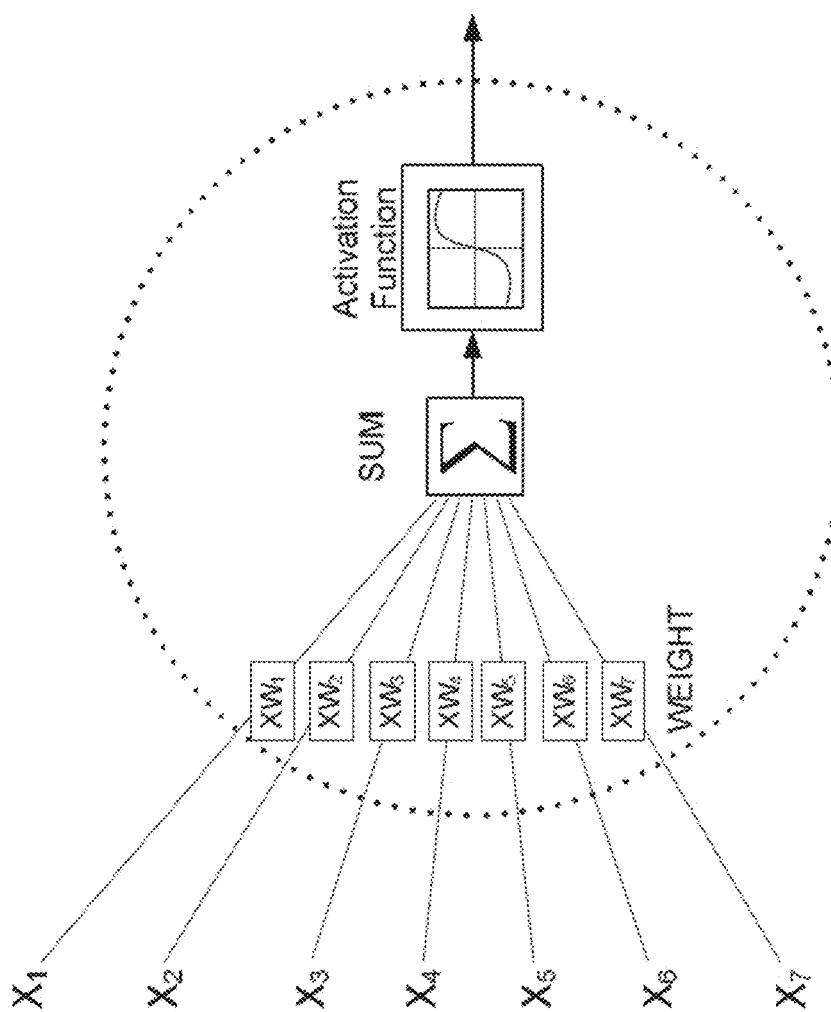
FIG. 1A is highly simplified schematic view of a neuron.
Figure 2:
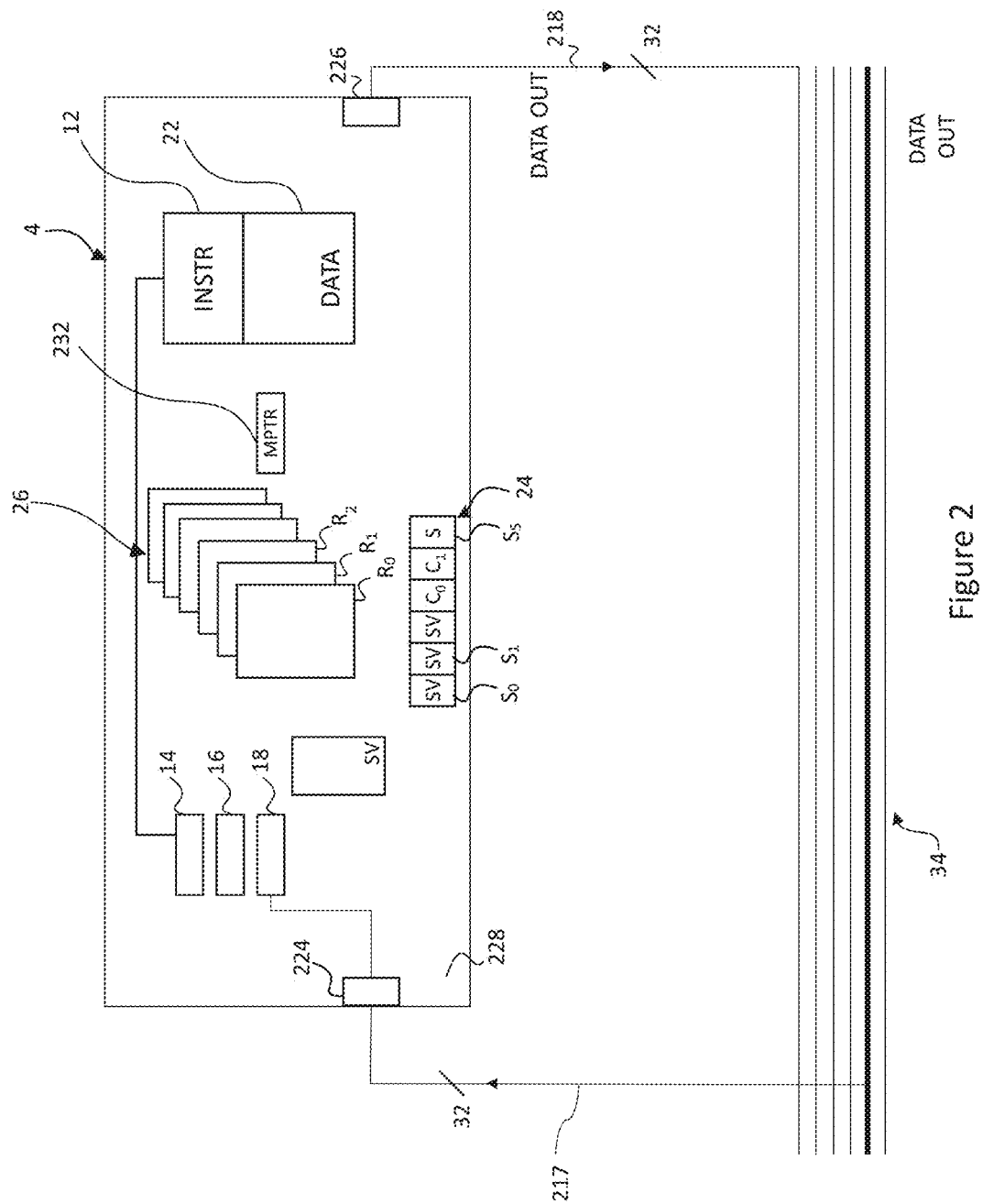
FIG. 2 schematically illustrates an arrangement for exchanging data between tiles.

FIG. 2 illustrates an example tile 4 in accordance with embodiments of the present disclosure. In the tile 4, multiple threads are interleaved through a single execution pipeline. Data is received at the tile via an exin interface 224, and transmitted from the tile via an exout interface 226. The tile 4 comprises: a plurality of contexts 26 each arranged to represent the state of a different respective one of a plurality of threads; a shared instruction memory 12 common to the plurality of threads; a shared data memory 22 that is also common to the plurality of threads; a shared execution pipeline 14, 16, 18 that is again common to the plurality of threads; and a thread scheduler 24 for scheduling the plurality of threads for execution through the shared pipeline in an interleaved manner. The thread scheduler 24 is schematically represented in the diagram by a sequence of time periods $S_0 \ldots S_5$, but in practice is a hardware mechanism for managing program counters of the threads in relation to their time periods. The execution pipeline comprises a fetch stage 14, a decode stage 16, and an execution stage 18 comprising an execution unit (EXU) and a load/store unit (LSU). Each of the contexts 26 comprises a respective set of registers $R_0$, $R_1 \ldots$ for representing the program state of the respective thread.

The fetch stage 14 is configured to fetch instructions to be executed from the instruction memory 12, under control of the thread scheduler 24. The thread scheduler 24 is configured to control the fetch stage 14 to fetch instructions from the local program for execution in each time period as will be discussed in more detail below.

The fetch stage 14 has access to a program counter (PC) of each of the threads that is currently allocated to a time period. For a given thread, the fetch stage 14 fetches the next instruction of that thread from the next address in the instruction memory 12 as indicated by the thread's program counter. Note that an instruction, as referred to herein, means a machine code instruction, i.e. an instance of one of the fundamental instructions of the computer's instruction set, made up of an opcode and zero or more operands. Note too that the program loaded into each tile is determined by a processor or compiler to allocate work based on the graph of the machine intelligence model being supported. Note that the operand may be given in an operand field in the instruction, or may be accessed by a memory address or register identifier at which the operand is stored. In a further example, the operand may be implicitly defined by the instructions (for example held in an implicitly defined register).

The fetch stage 14 then passes the fetched instruction to the decode stage 16 to be decoded, and the decode stage 16 then passes an indication of the decoded instruction to the execution stage 18 along with the decoded addresses of any operand registers of the current context specified in the instruction, in order for the instruction to be executed.

In the present example, the thread scheduler 24 interleaves threads according to a round-robin scheme whereby, within each round of the scheme, the round is divided into a sequence of time periods $S_0$, $S_1$, $S_2$, $S_3$, each for executing a respective thread. Typically each slot is one processor cycle long and the different slots are evenly sized (though not necessarily so in all possible embodiments). This pattern then repeats, each round comprising a respective instance of each of the time periods (in embodiments in the same order each time, though again not necessarily so in all possible embodiments). Note therefore that a time period in this context means the repeating allocated place in the sequence, not a particular instance of the time period in a given repetition of the sequence. In the illustrated embodiment, there are eight time periods, but other numbers are possible. Each time period is associated with a hardware resource, e.g. a register, for managing the context of an executing thread.

One of the contexts 26, labelled SV, is reserved for a special function, to represent the state of a "supervisor" (SV) whose job it is to coordinate the execution of "worker" threads. The supervisor can be implemented as a program organised as one or more supervisor threads which may run concurrently.

Each worker thread is a codelet intended to represent a vertex in the graph and to execute atomically. That is all the data it consumes is available at launch and all the data it produces is not visible to other threads until it exits. It runs to completion (excepting error conditions).

During execution, the worker threads may require different types of functions, such as divides and square roots, to be evaluated. One known algorithm that is frequently used to evaluate hyperbolic and trigonometric functions is the CORDIC algorithm. The CORDIC algorithm utilises a series of shift and add operations to determine values for functions. Such shift and add algorithms may be applied to evaluate logarithms, exponentials, divides and square roots. The shift and add operations may be implemented in an execution module which comprises shifters and adders.

One of the disadvantages of the use of such shift and add circuits can be the linear convergence provided by such circuits. For example, CORDIC converges linearly to the value of a function by determining a set number of bits of the result every iteration. This may require a larger number of iterations in the case that the precision level of the numerical values is high.

Embodiments of the application address one or more of these issues by providing an execution unit as a hardware module comprising a processing pipeline having at least one multiplier circuit along with additional processing circuitry, such as addition and subtraction circuits. Multipliers and the additional processing circuitry of the processing pipeline may be used in different configurations to perform multiplications so as to evaluate different functions. The processing pipeline comprises a plurality of state elements placed between the multipliers, to store state values at the input of each pipeline stage. The state elements are in some cases associated with multiplexers to alter the connections between pipeline stages. The hardware module comprises control circuitry that is configured to control the multiplexers so as to determine the function evaluated using the processing pipeline. The hardware module may be used in conjunction with innovative function evaluation techniques to carry out a number of different functions in a single structure.

The pipeline comprises multipliers arranged such that a first multiplier and a second multiplier are configured to perform their operations in parallel at the same stage in the processing pipeline. A third multiplier is arranged in series with the first and second multiplier and process values dependent upon the outputs of the first and second multipliers. This enables the pipeline to perform parts of the calculation of a mathematical function in parallel and then to provide results of the parallel processing to later stages of the pipeline for further processing. Hence, the arrangement of multipliers in the pipeline advantageously improves the flexibility of the pipeline to be applied to evaluate different functions using the control circuitry.

Figure 3:
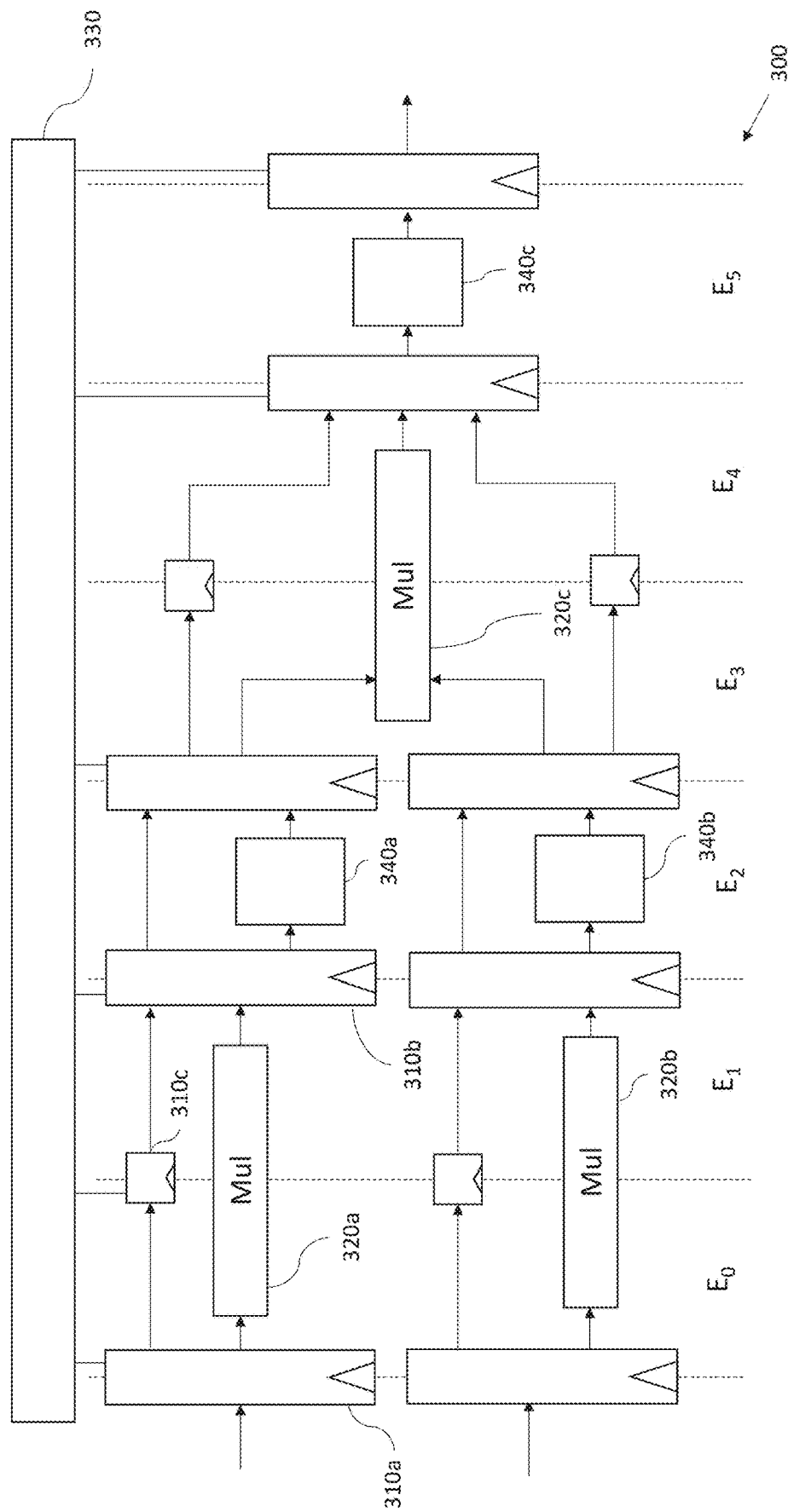
FIG. 3 illustrates a processing pipeline for evaluating functions.

Reference is made to FIG. 3, which illustrates an example of a processing pipeline 300 according to examples of the application. As shown, the pipeline is divided into a plurality of stages $E_0 \ldots E_5$.

The processing pipeline 300 comprises a plurality of multipliers 320a, 320b, 320c, each of which is configured to multiply together two input values and to provide an output value. Each of the multipliers in this example carries out its respective processing over two stages of the processing pipeline. For example, multipliers 320a and 320b perform their processing during stages $E_0$ and $E_1$ of the processing pipeline 300. Therefore, these multipliers 320a and 320b operate in parallel. Multiplier 320c, on the other hand, performs its processing during stages $E_3$ and $E_4$ of the pipeline. Multiplier 320c, therefore, operates in series with the other two multipliers 320a, 320b.

The pipeline 300 may also contain additional processing circuitry 340a, 340b, and 340c. This additional processing circuitry may be applied to perform a number of different operations, such as shifts and adds, on the results from the multipliers. The results of the first multiplier 320a may be processed by additional processing circuitry 340a. The results of the second multiplier 320b may be processed by additional processing circuitry 340b. The result of the third multiplier 320c may be processed by additional processing circuitry 340c.

The pipeline 300 comprises a plurality of state elements, such as flip-flops, (collectively referenced as 310) separating the stages of processing. The state elements are in some cases associated with multiplexers which control where the values resulting from each stage of processing are directed to during the next stage. The hardware module comprises control circuitry 330 for controlling the multiplexers. By controlling the multiplexers, the control circuity 330 is used to select a function to be calculated by the processing pipeline. A plurality of different types of functions may be evaluated using the processing pipeline 300 by controlling where the outputs at each stages are directed during the next stage. For example, input multiplexers at state element 310a are able to direct one or more received values such that they bypass the multiplier 320a during the stages $E_0$ and $E_1$ or such that they are delivered to the multiplier 320a for processing during the stages $E_0$ and $E_1$. Similarly, the multiplexer at input state element 310b is able to direct one or more received values such that they bypass the additional processing circuitry 340a during the stage $E_2$ or such that they are processed by the additional processing circuitry 340a during the stage $E_2$. The additional processing circuity 340a may be capable of performing several different types of operation—e.g. addition, subtraction, shift, etc—on input values it receives. The multiplexor at state element 310b may be configured to direct the values to specific inputs of the additional processing circuitry 340a so as to cause a selected operation—e.g. addition, subtraction, shift, etc—to be performed by the additional processing circuitry 340a.

The control circuitry 330 is configured, in response to the execution of an instruction by the execution unit, to control to which components the input values of the pipeline are directed.

For example, the control circuitry 330 is configured to implement a divide operation in the pipeline 300 in response to the execution of a divide instruction by the execution unit. The input variable/s for such a function are provided as operands of the instruction. When the instruction is executed, due to a transport delay in providing the variables to the pipeline 300, the variables may be introduced into the pipeline following the first stage $E_0$. The variables may be received at state element 310c, for example, bypassing the state element 310a and multiplier 320a. Similarly due to the transport delay, the result from the pipeline 300 may exit the pipeline 300 during the second to last stage $E_4$. The results that exit the pipeline 300 are returned to the worker thread that executed the instruction.

When variables that are being processed by the pipeline 300 reach the end of the pipeline 300, but the evaluation of the function is not yet complete, those variables are re-inserted into the pipeline at the first stage for another traversal of the pipeline. In this case, since variables are not returned to the worker thread that issued in the instruction, the hardware module comprising the pipeline indicates to the worker thread that the variables will not be returned and that another traversal of the pipeline is required.

When evaluating a mathematical function using the processing pipeline 300, the processing performed during each of the stages for that function may be performed during an allocated time slot. Each of the processing circuits in the pipeline 300 performs its processing during the time slot allocated for that processing. A single traversal of the pipeline 300 therefore takes 6 times slots to complete, since there are 6 stages. The processing performed by the multiplier 320a takes places over two stages ($E_0$ and $E_1$). For a traversal of the pipeline by at least one value, a time slot is allocated for any processing during stage $E_0$ and a separate time slot is allocated for any processing during stage $E_1$. The multiplier 320a is therefore configured to (if it has any processing to perform) perform its processing during the time slots allocated for stages $E_0$ and $E_1$. Similarly, a time slot is allocated for any processing during stage $E_2$ and the additional circuit 340a is configured to (if it has any processing to perform) perform its processing during the time slot allocated for stage $E_2$.

The processing pipeline 300 is configured to simultaneously evaluate a plurality of mathematical functions. During a single time slot, two or more of the plurality of stages in the pipeline 300 may be performing processing associated with different functions. For example, the multiplier 320b may perform some of the processing for evaluating a first mathematical function (e.g. a logarithm) during a first time slot. Also during the first time slot, the multiplier 320c may perform some of the processing for evaluating a second mathematical function (e.g. a divide).

Each of the components in the pipeline 300 may be configured to perform processing associated with different mathematical functions in different time slots. For example, during a first time slot, the additional circuitry 340b may be configured to perform part of the processing for evaluating a first mathematical function (e.g. a square root). Then, during a second time slot following the first time slot, the additional circuit may be configured to perform part of the processing for evaluating a second mathematical function (e.g. an exponential). Between the start of the first time slot and the start of the second time slot, the control circuitry 330 is configured to perform any necessary re-configuration of the relevant multiplexor/s to ensure that the correct input values are delivered to the correct inputs of the additional processing circuitry 340b such that the additional processing circuitry performs the relevant processing for the second mathematical function during the second time slot.

By selecting the appropriate operations to be applied to input variables, the processing pipeline 300 may be applied to implement logarithm, exponential, divide, or square root functions. For some of these functions, the processing pipeline may implement a Newton-Raphson method as part of the evaluation of a function.

The Newton Raphson method is a method for successively finding better approximations for roots of a function. Circuitry based on Newton Raphson using multipliers may be implemented to evaluate functions, such as divide and square root functions. The Newton Raphson formula for determining iterations may be derived from a Taylor expansion of function f near x:

$$f(x+h) = f(x) + hf'(x) + \frac{h^2}{2}f''(x) + \cdots \qquad \text{Eqn 1}$$

In many cases, terms higher than f'(x) can be ignored. Then, h can be determined as:

$$h = -\frac{f(x)}{f'(x)} \qquad \text{Eqn 2}$$

Applying Eqn 2 allows the roots of the function to be iteratively derived. The Newton-Raphson method starts out with an initial guess $x_0$ for a root of the function f, and iteratively determines better approximations of the root. Using the initial guess $x_0$, a better approximation, $x_1$, is given by:

$$x_1 = x_0 + h = x_0 - \frac{f(x_0)}{f'(x_0)} \qquad \text{Eqn 3}$$

The process is repeated to find better approximations by applying:

$$x_{n+1} = x_n - \frac{f(x_n)}{f'(x_n)} \qquad \text{Eqn 4}$$

Eqn 4 is known as a first order Newton-Raphson, since it is derived by ignoring all of the terms higher than the first derivative (f'(x)) in the Taylor expansion given by Eqn 1. If instead of ignoring all of the terms higher than the first derivative in Eqn 1, all of the terms higher than the second derivative (f''(x)) are ignored, then the second order Newton Raphson may be derived from the Taylor expansion:

$$x_{n+1} = x_n - \frac{f(x_n)}{f'(x_n)}\left(1 + \frac{2f(x_n)f'(x_n)}{2f'(x_n)^2}\right) \qquad \text{Eqn 5}$$

The first order Newton Raphson has the advantage that each iteration requires the use of fewer processing resources (e.g. multiplication and addition circuits) and less time to evaluate. The second order Newton Raphson has the advantage that each iteration produces a greater increase in accuracy.

As noted above, the CORDIC method for evaluating functions converges linearly and produces a set number of bits per iteration. Therefore, if initially only one bit of the answer is known, following each iteration in a CORDIC implementation, the known number of bits may increase as 1, 1+b, 1+2b, 1+3b . . . where b is the fixed number of bits produced per iteration. This method may require an undesirably high number of iterations, especially in the case that the required precision level of the result is high.

In contrast to the CORDIC method, the Newton Raphson Method instead produces increases in accuracy by a given factor in dependence upon the order used. If initially only one bit of the answer is known, following each iteration using a Newton Raphson of order n, the known number of bits increases as 1, $(n+1)^1$, $(n+1)^2$ . . . For example, if a Newton Raphson of $1^{st}$ order is applied, the number of known bits doubles with each iteration: 1, 2, 4 . . . In another example, if a Newton Raphson of $2^{nd}$ order is applied, the number of known bits triples with each iteration: 1, 3, 9 . . . If a Newton Raphson of $3^{rd}$ order is applied, the number of known bits quadruples with each iteration: 1, 4, 16 . . . .

Therefore, it can be seen that with a second order Newton Raphson, an error reduction by a factor of 3 may achieved in only one iteration.

It is noted, however, that due to the scaling nature of Newton Raphson, the initial iteration produces relatively few known bits in comparison with later iterations. Therefore, in embodiments of the present application, a look up table is implemented to look up values for initial estimates, prior to applying the Newton Raphson method to improve upon the accuracy of the initial estimate. In this way, the number of Newton-Raphson iterations required to estimate a value for a function may be reduced.

The Newton Raphson method for determining the roots of functions may be applied to evaluate a plurality of commonplace functions. A look up table is combined to determine an initial value of a variable that is to be estimated using a circuit implementing the Newton Raphson method.

According to embodiments of the application, the hardware module is provided with at least one look up table. To evaluate a function of an operand, the look up table is searched using an index determined from the at least one operand to determine an initial estimate for the function. The hardware module comprises multiplication and addition/subtraction circuitry used to perform one or more Newton Raphson iterations, so as to improve the accuracy of the estimate derived from the look up table.

Once the Estimate for the value of the function based upon one or more Newton-Raphson iterations has been obtained, the hardware module is configured to perform a rounding operation so as to place the result in the floating point format. For example, the single-precision floating point format has a mantissa length of 23 bits. The result based on the Newton-Raphson iteration/s comprises a greater number of bits, and therefore the bits of the result that extend beyond the mantissa length specified by the IEEE 754 standard are removed (i.e. the result is truncated) and the LSB is rounded up or down in dependence upon the bits truncated from the mantissa.

An issue may arise during the rounding process, which is that, since the result based on the Newton-Raphson estimate is not known to infinite precision, the rounding process may result in a rounding in a different direction to the direction in which the true (infinite precision) result would be rounded. Reference is made to FIG. 4, which shows a number line 400 illustrating floating point numbers increasing by one unit in the last place (ULP). In other words, the value of the mantissa increases along the number line 400 by the smallest graduation possible in single precision floating point format. The LSB of the mantissa has a value of $2^{-23}$, and therefore, the number line 400 shows the floating point numbers: $F-2^{-23}$, F, $F+2^{-23}$. Although this example illustrates the case in which the floating point numbers are expressed in single precision, in some examples, the floating point numbers may be expressed at a different precision level, e.g. in half (16 bit) precision.

When the Newton Raphson method is applied to approximate a function, the output may not be exactly equal to a floating point number expressible in the single-precision. In the example, in FIG. 4, the output of the Newton-Rapson approximation, lies between F and $F+2^{23}$. Since the output is closer to F, when the output is truncated and the LSB is rounded, the result will be equal to F. As can be seen in FIG. 4, the true result (i.e. the infinite precision result) is within 1 ULP of the output of the Newton-Raphson approximation. Nevertheless, the true result lies within a different floating point interval such that it would round to a different floating point number. As shown in FIG. 4, if the true result were truncated and rounded to a single precision floating point number, the rounded result would be $F-2^{-23}$. This is different to the rounded result of the Newton-Raphson approximation, which is F.

In order to correct for this rounding error, the execution unit is configured to perform a reversal operation of the function using the Newton-Rapson approximation to determine the error associated with the Newton-Raphson approximation. The magnitude and sign of the error is used to determine how to round the result from the Newton-Raphson approximation. The magnitude and sign of the error are used to select between one of three different values to which the result from the Newton Raphson approximation is rounded to.

In the example of FIG. 4, if the result of the reversal operation indicates an error that is less than a predefined magnitude, then the approximation is rounded to the centre value (i.e. F):

$$\text{If } |R(NR)| \leq 2^{-24} \rightarrow \text{Result}=F \qquad \text{Eqn 6}$$

If the result of the reversal operation indicates an error that is negative and greater than a predefined magnitude, then the approximation is rounded to the lower value (i.e. $F-2^{-23}$):

$$\text{If } R(NR) < -2^{-24} \rightarrow \text{Result}=F-2^{-23} \qquad \text{Eqn 7}$$

If the result of the reversal operation indicates an error that is positive and greater than a predefined magnitude, then the approximation is rounded to the upper value (i.e. $F+2^{-23}$):

$$\text{If } R(NR) > 2^{-24} \rightarrow \text{Result}=F+2^{-23} \qquad \text{Eqn 8}$$

By applying this method, it may be ensured that the result from the Newton-Raphson approximation is rounded to the same floating point value that the true result would round to. Specific examples of the reversal operations will be given for the functions evaluated according to embodiments of the application.

As noted, embodiments of the application may be applied to evaluate several commonplace functions.

In some examples, the Newton Raphson method may be applied in combination with a look up table to evaluate a divide operation that is given by:

$$y = \frac{n}{d} \qquad \text{Eqn 9}$$

To evaluate this divide operation, an estimate X, for the reciprocal of the divisor is first determined:

$$X \approx \frac{1}{d} \qquad \text{Eqn 10}$$

In order to apply the Newton Raphson method to determine X, a function f(X) that is equal to zero at X=1/d is applied. Such a function is given by:

$$f(X) = \frac{1}{X} - D \qquad \text{Eqn 11}$$

Using this function (f (X)) in Eqn 4 above gives:

$$X_{n+1} = X_n - \frac{1/X_n - d}{-1/X_n^2} = X_n(2 - dX_n) \qquad \text{Eqn 12}$$

Iteratively applying Eqn 12 enables an estimate for the reciprocal $$\left(\frac{1}{d}\right)$$

of the divisor to be determined. A circuit comprising two multiplier circuits and an addition/subtraction circuit may be used to evaluate each iteration.

Eqn 12 is the first order Newton-Raphson for evaluating the reciprocal of a number. If the function (f (X)) given in Eqn 11 is instead used in Eqn 5, then the second order Newton Raphson for evaluating a reciprocal may be derived:

$$X_{n+1} = X_n(3 - dX_n(3 - dX_n)) \qquad \text{Eqn 13}$$

Hence, different orders of Newton Raphson may be applied to evaluate the reciprocal of the divisor. A multiplication may be applied between the evaluated reciprocal $$\left(\frac{1}{d}\right)$$

and the dividend (n) to evaluate the divide operation:

$$y = n * \frac{1}{d} \qquad \text{Eqn 14}$$

Once the approximation for the divide operation has been obtained from Eqn 14, the correction by reversal technique is applied. The reversal operation for the division is given by:

$$R(y) = y*d - n \qquad \text{Eqn 15}$$

The hardware module is configured to evaluate this function given by Eqn 15, and in dependence upon the value of R(y), determine how to round the LSB of the mantissa of the floating point number result. When the floating point number is a single precision number, the LSB of the mantissa is rounded as indicated by Eqns 6-8.

Figure 5A:
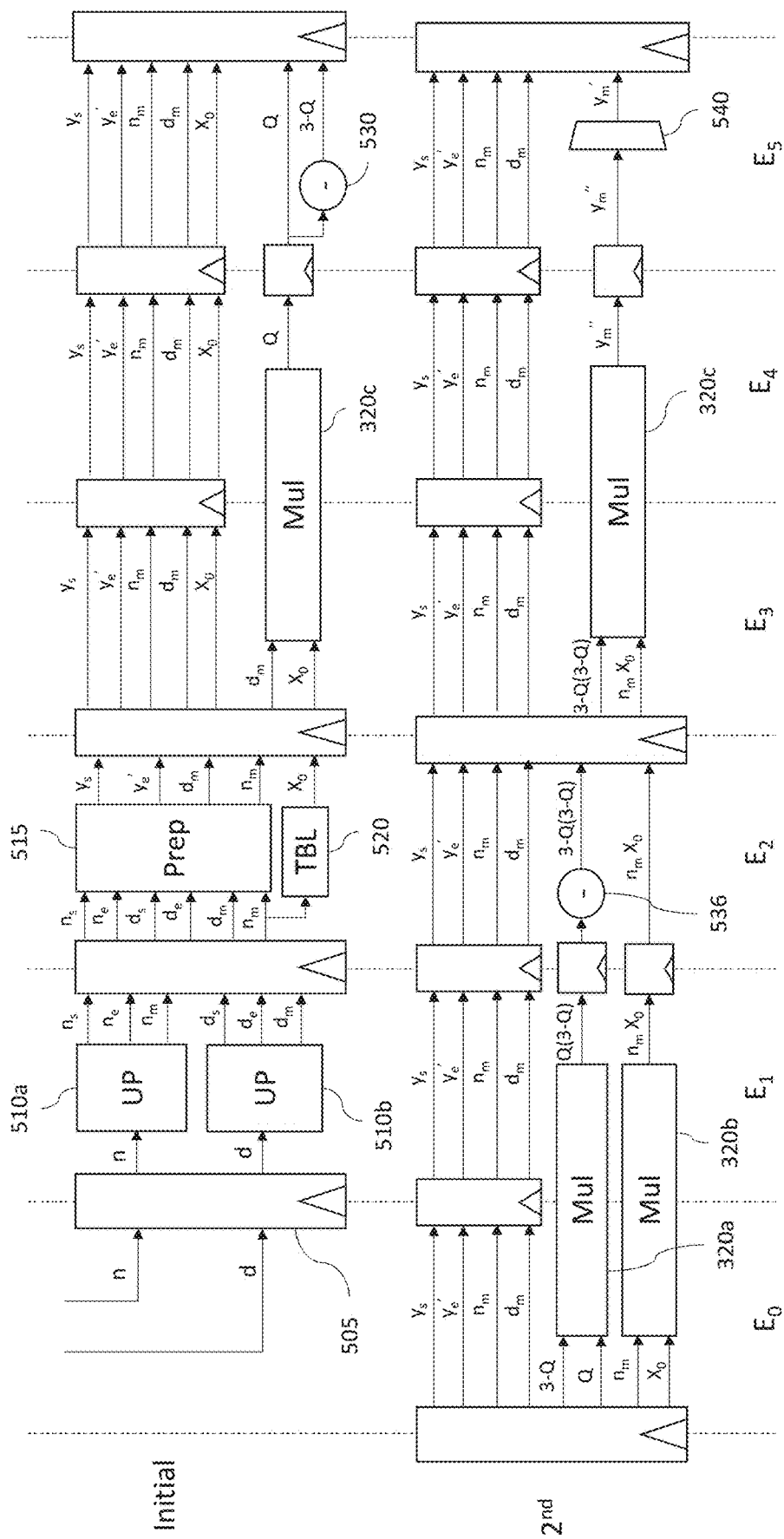
FIG. 5a illustrates the first two traversals of the processing pipeline for calculating a divide.

Reference is made to FIG. 5a, which illustrates the first part of an example of the use of the pipeline 300 (or variations thereof) for evaluating a division operation of two numbers.

The numerator (n) and denominator (d) are received at the state element 505. The numerator and denominator may be delivered to the hardware module in response to the execution of a divide instruction. The numerator and denominator are operands of the divide instruction. The numerator and denominator are introduced to the pipeline during the first processing stage $E_0$, since a transport delay associated with delivering the values and control information associated with the operation to the hardware module prevents the values from being introduced prior to the first processing stage $E_0$. The numerator and denominator are both floating point numbers.

Each of the numerator and the denominator are delivered to respective unpack circuitry 510a, 510b. The unpack circuitry 510a is configured to unpack the numerator into its respective sign ($n_s$), exponent ($n_e$), and mantissa ($n_m$) parts. The unpack circuitry 510b is configured to unpack the denominator into its respective sign ($d_s$), exponent ($d_e$), and mantissa ($d_m$) parts.

The preparation circuit 515 is configured to check the exponent components ($d_e$ and $n_e$) to determine if the exponents take one or more special values, and to output a relevant special result if so. The preparation circuit 515 is configured to determine if the difference between the numerator minus the denominator is greater than a predefined value such that the result would be too large to represent at the chosen precision level e.g. in single precision floating point format. In this case, a floating point number representing infinity is output as the result from the pipeline without requiring all of the usual steps in the pipeline to be carried out. Similarly, the preparation circuit 515 is configured to determine if the numerator minus the denominator is less than a predefined value such that the result would be too small to represent at the chosen precision level, e.g. in single precision floating point format. In that case, the floating point result that is output is zero.

Assuming that the floating point number does not take a special value, as discussed above, the prep circuitry 515 is configured to determine from the sign ($d_s$, $n_s$) and exponent ($n_e$, $d_e$) components, the sign ($y_s$) and exponent ($y_e$) components for the result of the division operation. The exponent ($y_e'$) for the result can be calculated by performing a subtraction of the exponent ($d_e$) of the denominator from the exponent ($n_e$) of the numerator. Following this subtraction, the exponent ($y_e'$) may still need to be normalised in dependence upon the result of the calculation of the mantissa to yield the exponent result ($y_e$) which is packed into the final floating point result, as will be described later. The sign component ($y_s$) for the result can be calculated by comparing the sign ($n_s$) of the numerator with the sign ($d_s$) of the denominator. If $n_s$ and $d_s$ are the same (i.e. either both negative or both positive), then $y_s$ will be positive. If $n_s$ and $d_s$ are different (i.e. one is negative and the other is positive), then $y_s$ will be negative.

The preparation circuit 515 is also configured to normalise the components to specific ranges. The preparation circuit 515 is configured to ensure that the mantissa ($d_m$) of the denominator is within the correct bit-range of the internal state register. The preparation circuit 515 is also configured to adjust the exponent ($d_e$) to compensate for the adjustment to the mantissa ($d_m$).

The mantissa ($d_m$) of the denominator is used to search a look up table 520. The look up table 520 contains a series of estimates for the mantissa of the reciprocal of the denominator that can be used as starting values for the Newton-Raphson method. A subset of the bits of the mantissa of the denominator are used as an index into the look up table 520 to search the look up table to provide an initial estimate $X_0$ for the mantissa of the reciprocal. For example, the hardware module may use the 10 MSBs of the mantissa of the denominator as an index to search the look up table 520. After obtaining the initial estimate $X_0$ of the denominator from the look up table 520, the hardware module is configured to apply the Newton-Raphson method to determine a more precise estimate for the reciprocal.

The multiplier 320c is configured to multiply the initial estimate ($X_0$) for the reciprocal with the denominator ($d_m$). In FIG. 6, the output of this multiplication is labelled as Q, where $Q=d_m X_0$.

The subtraction circuit 530 is configured to subtract Q from the number 3. This subtraction takes place during the sixth stage ($E_5$) of the pipeline. The variables ($y_s$, $y_e'$, $n_m$, $d_m$, $X_0$, Q, 3-Q) received at the end of the pipeline are re-inserted at the start of the pipeline.

The multiplication circuit 320a is configured to multiply 3-Q with Q. The multiplication circuit 320b is configured to multiply $n_m$ with $X_0$ to obtain an estimate for the mantissa of the result of the division based on the look up table output.

The subtraction circuit 536 is configured to subtract the output (Q(3-Q)) of the multiplier 320a from the number 3.

The multiplier circuit 320c is configured to multiply the output (3-Q(3-Q)) of the subtraction circuit 536 with the initial estimate ($n_m X_0$) of the mantissa of the divide result from the multiplier 320b. The output of the multiplier 320c provides an updated estimate ($y_m''$) for mantissa of the divide result. As can be seen from Eqns 13 and 14, multiplying the initial estimate ($n_m X_0$) with the factor 3-Q(3-Q) is equivalent to using Newton Raphson to determine an estimate for the reciprocal and then multiplying by the numerator.

The estimate ($y_m''$) of the mantissa for the divide result is passed to the circuit 540, which is configured to produce a normalised estimate ($y_m'$) of the mantissa.

Figure 5B:
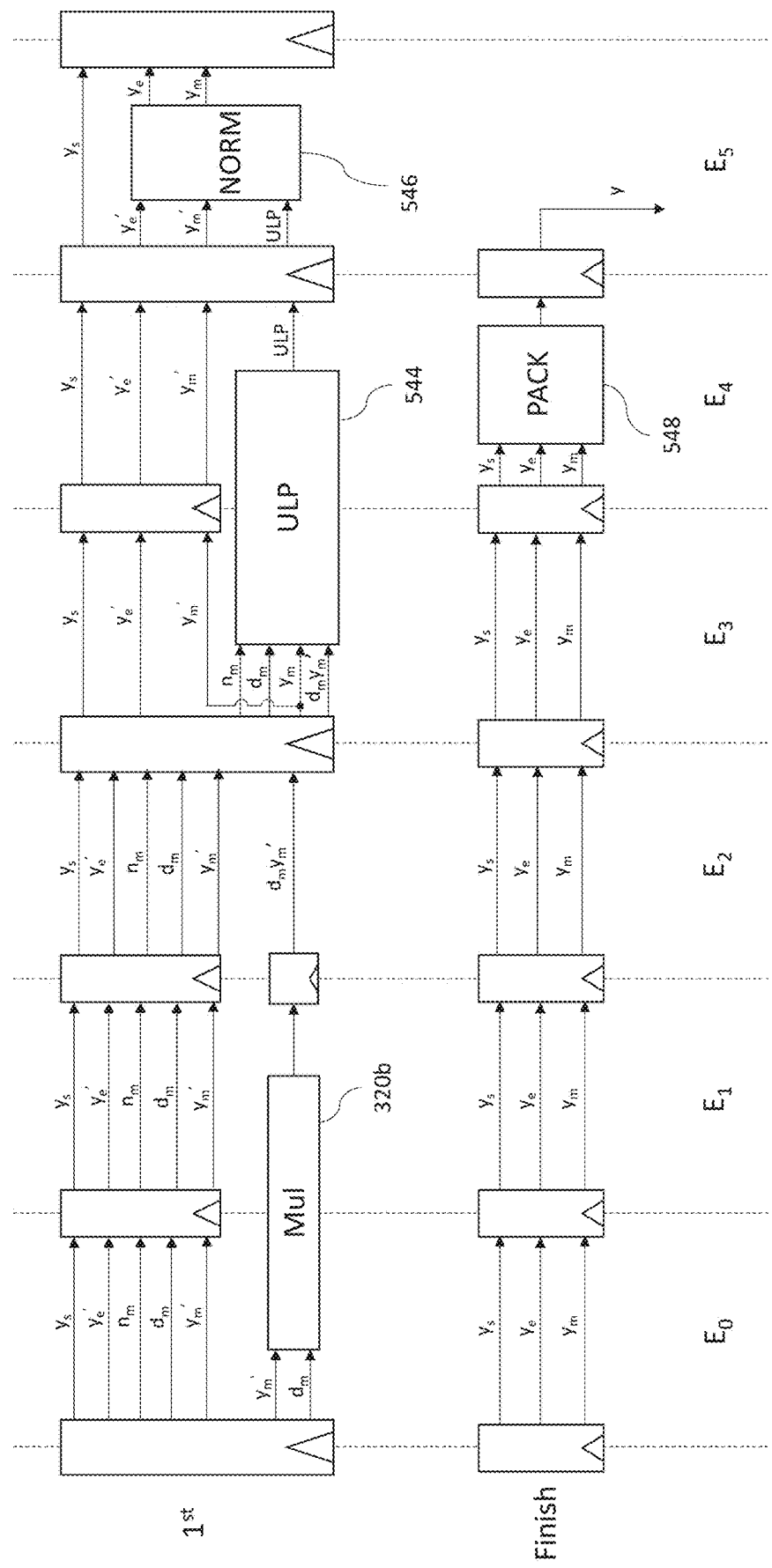
FIG. 5b illustrates the final two traversals of the processing pipeline for calculating a divide.

Reference is made to FIG. 5b, which illustrates the subsequent processing by the pipeline of the hardware module when evaluating the divide operation.

The multiplier 320b is configured to multiply the estimate ($y_m'$) of the mantissa of the divide result by the denominator ($d_m$). This operation is part of the reversal operation used to determine the ULP of the mantissa of the divide result. The output ($d_m y_m'$) of the multiplier 320b should be approximately equal to the mantissa ($n_m$) of numerator.

The ULP circuit 544 is configured to determine the Unit in the Last Place for the mantissa based on the output ($d_m y_m'$) from the multiplication of $y_m'$ and $d_m$ carried out by the multiplier 320b. The ULP circuit 544 comprises a subtraction circuit configured to subtract the numerator ($n_m$) from the output ($d_m y_m'$) of the multiplier as in Eqn 15. The ULP circuit 544 is then configured to compare the magnitude and sign of the resulting error value to the different limits (as given by Eqns 6 to 8) to determine a value for the ULP.

The ULP is passed to the Normalisation circuit 546, which is configured to normalise and truncate the estimated mantissa ($y_m'$) and set the determined ULP to the ULP for the truncated mantissa. The normalisation process may involve shifting the mantissa. The output of this process is the mantissa ($y_m$) in the length required by the floating point format of a particular precision level. The truncation process may truncate the mantissa length to the length (i.e. 23 bits) specified for single precision floating point format.

The normalisation circuit 546 is also configured to adjust the exponent ($y_e'$) to obtain the exponent ($y_e'$) of the result in dependence upon the amount of shifting performed to normalise the mantissa.

The pack circuitry is configured to pack the different components ($y_s$, $y_e$, $y_m$) into the floating point number result (y) of the divide operation. The result is output from the pipeline and provided to the worker thread that executed the divide instruction.

Therefore, the pipeline 300 can be used to implement the Newton-Raphson method in combination with a look up table to evaluate a division operation.

In some examples, the Newton-Raphson method can be applied to determine an estimate for the square root (z) of a floating point number (x). The square root function may be written as:

$$z = \sqrt{x} = \frac{x}{\sqrt{x}} = r*x \qquad \text{Eqn 16}$$

where r is given by:

$$r = \frac{1}{\sqrt{x}} \qquad \text{Eqn 17}$$

In order to apply the Newton Raphson method to determine r, a function f(r) that is equal to zero at $r=1/\sqrt{x}$ is applied. Such a function is given by:

$$f(r)=r^{-2}-x \qquad \text{Eqn 18}$$

Using this function in the first order Newton-Raphson of Eqn 4 gives:

$$r_{n+1} = \frac{r_n}{2}(3 - xr_n^2) \qquad \text{Eqn 19}$$

Eqn 18 may, therefore, be used to iteratively determine the value of r. The initial value of r (i.e. $r_0$) is determined from a look up table of the hardware module. The value of $r_0$ is selected from the look up table in dependence upon the value of x. One or more Newton Raphson iterations are then applied to determine a value for r at a higher level of precision.

Once r is determined at the higher level of precision, Eqn 16 is applied to determine the value of the square root (z).

Once the approximation for the square root has been obtained using the Newton-Raphson method, the correction by reversal technique is applied. The reversal operation for the division is given by:

$$R(z)=z^2-x \qquad \text{Eqn 20}$$

The hardware module is configured to evaluate this function given by Eqn 20 and, in dependence upon the value of R(y), determine how to round the LSB of the truncated mantissa of the floating point number result. When the floating point number is a single precision floating point number, the LSB of the truncated mantissa is rounded as indicated by Eqns 6-8.

Figure 6A:
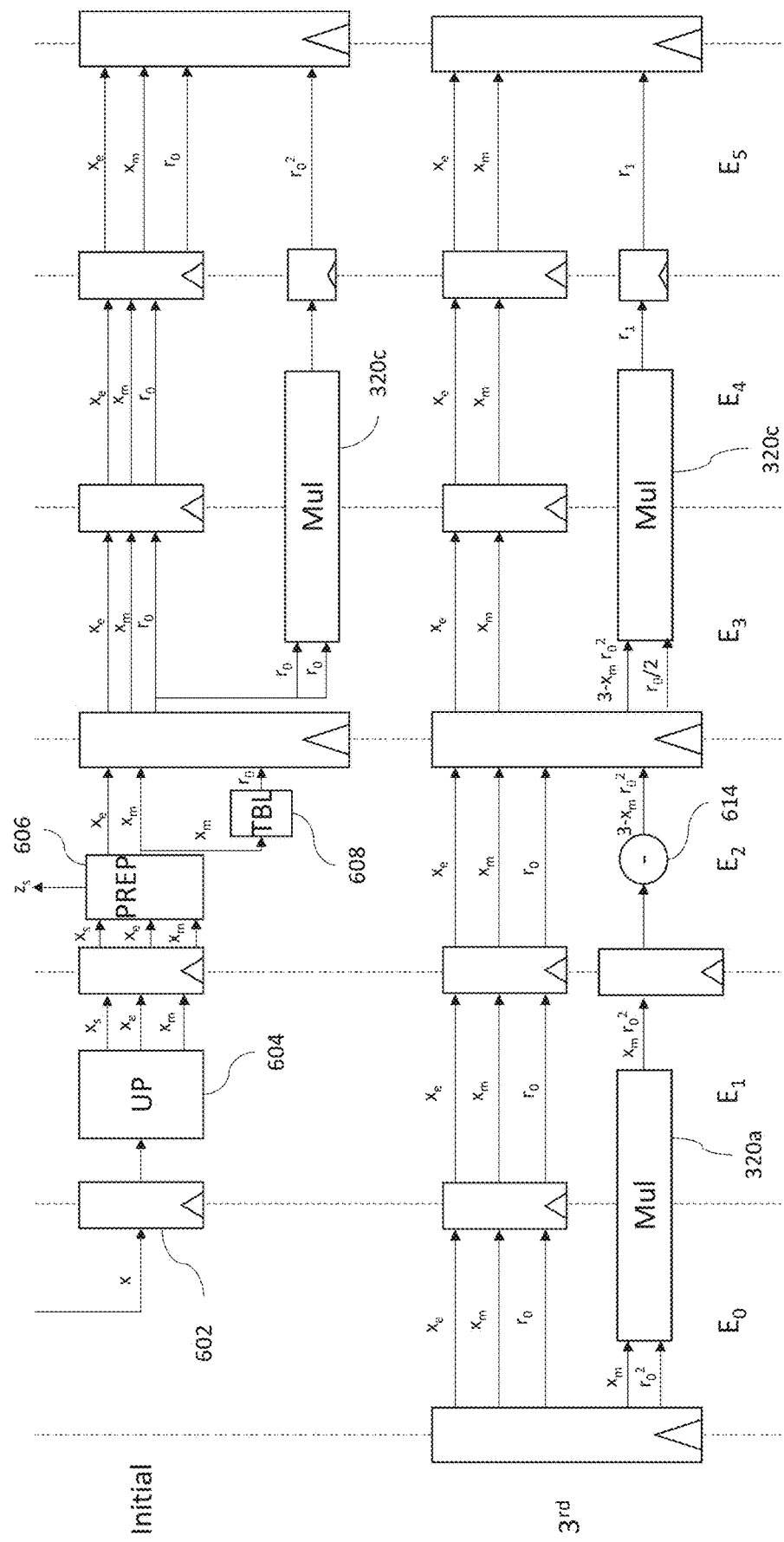
FIG. 6a illustrates the first two traversals of the processing pipeline for calculating a square root.

Reference is made to FIG. 6a, which illustrates an example of processing by the pipeline 300 used to evaluate the square root of a floating point number. According to embodiments of the application, variants of the pipeline 300 may also be used to evaluate the square root.

The execution unit is configured to execute an instruction comprising an op code and an operand. The op code indicates a square root function that is to be evaluated by the execution unit. The operand is the input floating point number (x) of which the square root is to be determined. The input floating number (x) is provided to the pipeline of the execution unit. A state element 602 of the pipeline receives the input floating point number (x), the square root of which is to be determined. The input floating point number (x) is passed to the unpack circuitry 604, which is configured to extract the sign bit ($x_s$), exponent ($x_e$) and mantissa ($x_m$) from the input (x).

The preparation circuit 606 receives the extracted exponent ($x_e$) and mantissa ($x_m$) and performs any necessary preparation on these values. The preparation circuit 606 is configured to check the components to determine if the components take one or more special values, and output a relevant special result if so. For example, if the sign bit ($x_s$) is negative then the result of the square root function will be a NaN, irrespective of the values of the mantissa and exponent. Therefore, a NaN may be output as the result from the pipeline without requiring all of the usual steps in the pipeline to be carried out. Similarly, the preparation circuit 606 is configured to determine if x has a value less than a predefined value, such the result is too small to represent at the chosen precision level e.g. in single precision floating point format. In this case, the result output is zero. Similarly, the preparation circuit 606 is configured to determine if x has a value larger than a predefined value, such that the result is too large to represent at the chosen precision level, e.g. in single precision floating point format. In that case, the result output is infinity.

The preparation circuit 606 is also configured to normalise the components to specific ranges. The exponent ($x_e$) is made even (if it is not already) by subtracting 1 from the exponent. This allows the exponent to be divided by 2 by as described later. To compensate for the subtraction of 1 from the exponent, the mantissa ($x_m$) is shifted to the left by one bit. The sign bit ($x_s$) is the sign bit ($z_s$) for the final result, and is stored to be packed with the other components later.

The mantissa ($x_m$) is then used to search the look up table 608 so as to output from the look up table an estimate ($r_0$) of the reciprocal of the square root of $x_m$.

The look up table 608 comprises a plurality of entries, each providing an estimate for the reciprocal of the square root of a value. The mantissa ($x_m$) of the input is used to search the look up table for such an estimate ($r_0$) for an estimate of the mantissa of the reciprocal of the square root of x, which is output from the table and then used as an initial value for applying the Newton-Raphson method to determine a more precise estimate for the mantissa of the reciprocal of the square root. The look up table 608 is searched using a subset of bits of the mantissa ($x_m$) as an index value. For example, the look up table 608 may be searched using the 10 most significant bits of the mantissa ($x_m$).

The output ($r_0$) from the look up table 608 is provided to the multiplier 320c, which is configured to multiply $r_0$ by itself. In other words, the multiplier 320c is configured to determine the square of $r_0$.

The multiplier 320a receives $r_0^2$ and multiplies this with $x_m$ to obtain $x_m r_0^2$. The subtraction circuit 614 is then configured to subtract $x_m r_0^2$ from the number 3.

The multiplier 320c is configured to multiply the output ($3-x_m r_0^2$) of the subtraction circuit 614 with half the value from the look up table ($r_0/2$) to obtain the updated estimate ($r_1$) for the mantissa of the reciprocal of the square root of x. This is the result of one iteration of the first order Newton-Raphson method, which doubles the number of known bits of the reciprocal of the square root of x. Another iteration will then be performed so as to again double the number of known bits.

Figure 6B:
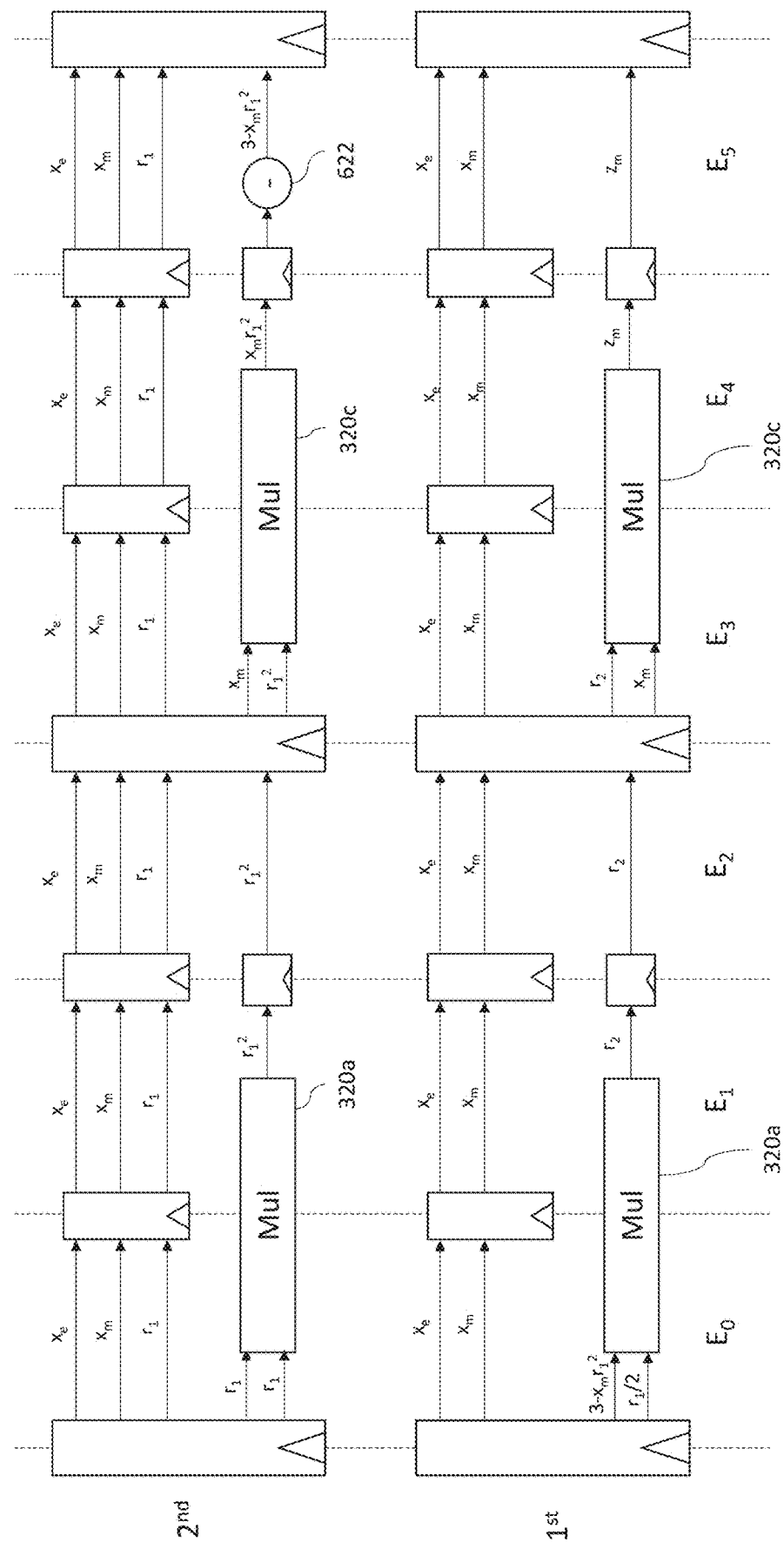
FIG. 6b illustrates the next two traversals of the processing pipeline for calculating a square root.

Reference is now made to FIG. 6b, which illustrates the continuation of the process (which has so far been described with reference to FIG. 6a) for determining the square root of a floating point number (x).

The updated estimate ($r_1$) for the mantissa of the reciprocal of the square root following the first iteration is provided to the multiplier 320a, which is configured to determine the square of $r_1$.

The multiplier 320c is configured to multiply $x_m$ with the square ($r_1^2$) determined by the multiplier 320a. The result ($x_m r_1^2$) from the multiplier 320c is provided to the subtraction circuit 622, which is configured to subtract $x_m r_1^2$ from the number 3.

During the next traversal of the pipeline, the multiplier 320a is configured to multiply $3-x_m r_1^2$ with $r_1/2$ to generate the estimate ($r_2$) of the mantissa for the reciprocal of the square root following two iterations of the first order Newton Raphson.

Unlike in the example given for the divide operation, two iterations of Newton Raphson are used during the calculation of the square root. In the divide example, only a single iteration is required to generate an estimate of the required precision for a single precision floating point result since a second order Newton-Raphson (which triples the number of known bits each iteration) is used. On the other hand, in the square root example, two iterations are used to generate an estimate of the required precision for a single precision floating point result since a first order Newton-Raphson (which doubles rather than triples the number of known bits each iteration) is used.

Following the generation of the estimate ($r_2$) for the mantissa of the reciprocal of the square root, the multiplier 320c is configured to multiply $r_2$ with $x_m$ to obtain a mantissa value ($z_m$) for the square root of x.

Figure 6C:
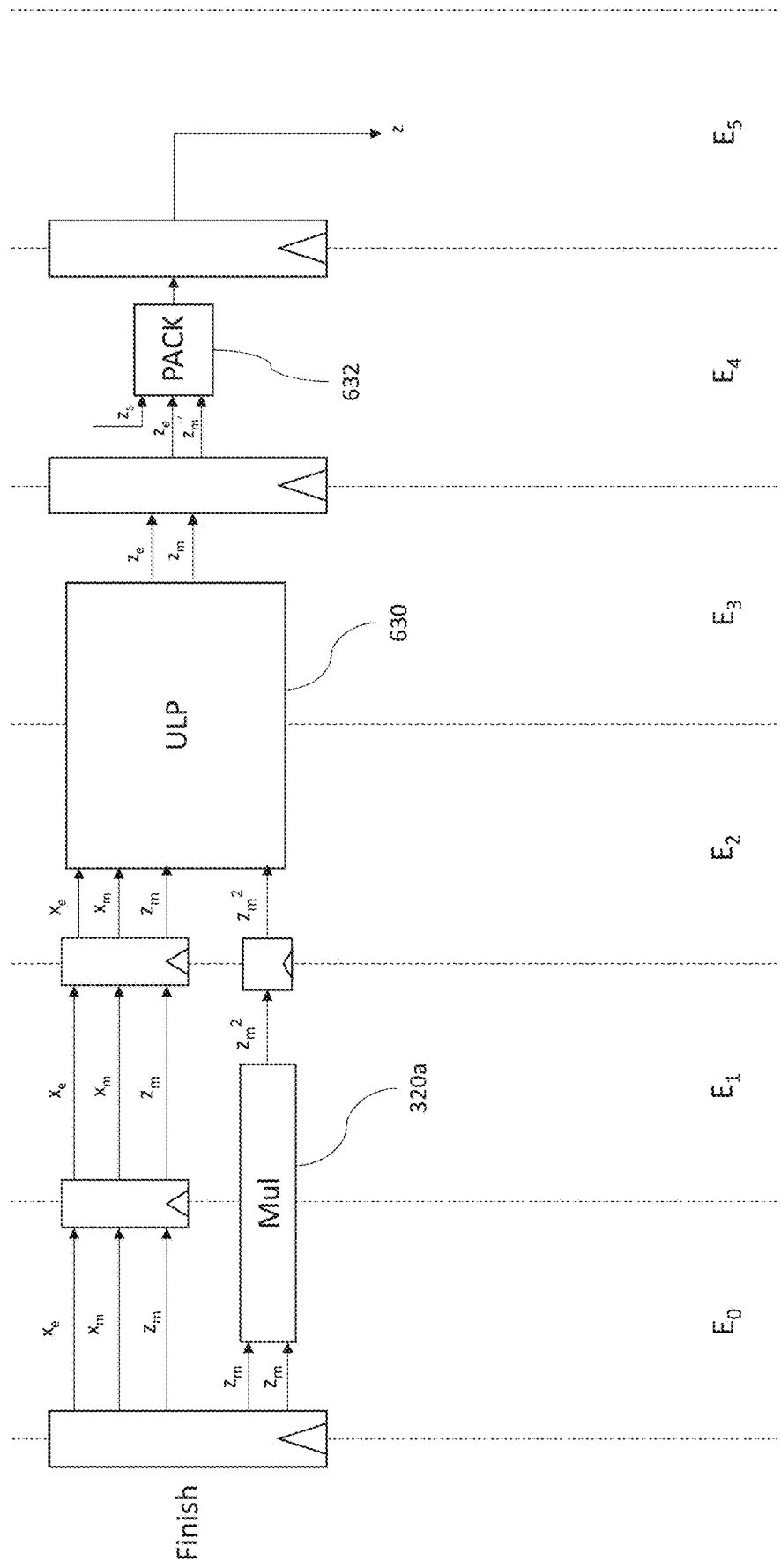
FIG. 6c illustrates the final traversal of the processing pipeline for calculating a square root.

Reference is now made to FIG. 6c, which illustrates the continuation of the process (which has so far been described with reference to FIGS. 6a and 6b) for determining the square root of a floating point number (x).

The process for performing the correction by reversal is shown in FIG. 6c. The square root value ($z_m$) is supplied to the multiplier 320a, which is configured to determine the square ($z_m^2$) of $z_m$. The square ($z_m^2$) will be approximately equal to the input value $x_m$, for which the square root was calculated. The value $z_m^2$ is passed to the ULP circuit 630.

The ULP circuit 630 is configured to determine the Unit in the Last Place (ULP) for the truncated mantissa in dependence upon the output ($z_m$) of the multiplier 320a. The ULP circuit 630 comprises subtraction circuitry configured to subtract the input variable ($x_m$) from the square ($z_m^2$) of the result ($z_m$) as in Eqn 20. The ULP circuit 630 is then configured to compare the magnitude and sign of the resulting error value to different limits (as given by Eqns 6 to 8) to determine a value for the ULP.

The ULP circuit 630 in this example is also configured to normalise and truncate the estimated mantissa ($z_m$) and add the determined ULP to the truncated mantissa. Alternatively, one or more of these steps may be performed by additional circuitry that is separate from the ULP circuit 630. The normalisation process may involve shifting the mantissa. The output of this process is the mantissa ($z_m'$) in the length required by the floating point format of a particular precision level. The truncation process may truncate the mantissa length to the length (i.e. 23 bits) as specified for single precision floating point format.

The ULP circuit 630 is also configured to adjust the estimate of the exponent ($x_e$) to obtain the exponent ($z_e$) of the result. The amount of adjustment to the exponent is dependent upon the amount of shifting required to normalise the mantissa. The exponent is also divided by two as a result of the square root operation. This modification to the exponent could be carried out by another component of the pipeline and may be carried out by the preparation circuit 606.

The final normalised components ($z_s$, $z_e$, $z_m'$) for the floating point result are then passed to the pack circuit 632, which is configured to pack the components to provide the floating point result (z) for the square root of x. The sign component ($z_s$) is set equal to the sign ($x_s$) of the input variable, assuming that the input variable (x) has a positive value.

Therefore, the hardware module enables a square root operation to be evaluated using multiplication and addition/subtraction operations.

The multiplier circuit of the hardware module may also be used for the evaluation of logarithms. The hardware module is configured to apply different methods to evaluate a logarithm for different parts of the input range.

If a logarithm to be evaluated is given by ln(x), and $x < e^{1/16}$, the following Taylor series is taken to apply:

$$\ln(x) = \ln(1+\delta) \approx \delta - \frac{\delta^2}{2} + \frac{\delta^3}{3} \qquad \text{Eqn 21}$$

The multiplier circuit can be used to evaluate this Taylor expansion within the indicated input range in order to evaluate ln(x). This approximation for ln(x) may be implemented in the processing pipeline 300 by using an addition/subtraction circuit in the preparation block 410 to determine δ, and then by supplying δ as an input to the multiplier circuits 320a, 320b, and 320c as applicable to determine each item of the polynomial series in Eqn 21. Each item of the polynomial series may then be summed or subtracted from the preceding item using an addition circuit in the processing pipeline. The addition circuits are described in more detail in relation to determining the logarithmic function when $x \geq e^{1/16}$ as laid out in the following.

The same addition/subtraction circuits in the same processing pipeline may be used to determine the logarithmic function for both ranges of x.

The mathematical derivation for the method applied when $x \geq e^{1/16}$ is given below, followed by its application in the processing pipeline 300. If $x \geq e^{1/16}$, then ln(x) is evaluated using the expression:

$$\ln(x) = \ln(c_k) + \ln\left(\frac{x}{c_k}\right) \qquad \text{Eqn 22}$$

where $c_k$ is given by:

$$c_k = 1 + \frac{k}{64} \qquad \text{Eqn 23}$$

k is an integer chosen from the set $k \in \{0,1,\ldots,64\}$, such that $$|x - c_k| \leq \frac{1}{128}.$$

In this case $x/c_k$ is close to 1.

A look up table is provided in the hardware module for looking up the value of $\ln(c_k)$. The look up table comprises 64 entries, with there being a separate entry for each of the values of k.

Since $$|x - c_k| \leq \frac{1}{128},$$

then $x/c_k$ is close to one such that a Taylor series approximating ln $$\left(\frac{x}{c_k}\right)$$

may be made use of. The Taylor series that approximates ln $$\left(\frac{x}{c_k}\right)$$

is evaluated using the processing pipeline according to embodiments of the application.

When evaluating ln $$\left(\frac{x}{c_k}\right), \frac{x}{c_k}$$

may be re-written as:

$$\frac{x}{c_k} = \frac{1 + \frac{r}{2}}{1 - \frac{r}{2}} \qquad \text{Eqn 24}$$

where:

$$r = \frac{2(x - c_k)}{(x + c_k)} \qquad \text{Eqn 25}$$

ln $$\left(\frac{x}{c_k}\right)$$

may then be approximated as:

$$\ln\left(\frac{x}{c_k}\right) \approx 2\left(\frac{r}{2} + \frac{1}{3}\left(\frac{r}{2}\right)^3 \ldots\right) \qquad \text{Eqn 26}$$

The processing pipeline according to examples of the application is applied to evaluate the Taylor series given by Eqn 26. The substitution given by Eqn 24, therefore, allows the even powers to be eliminated from the Taylor series expansion of $\ln(x/c_k)$.

In order to determine the value of r, the Newton-Raphson method and look up table for the divide function, as discussed above, is applied. Taking the denominator to be $(x+c_k)$, the reciprocal (R) of the denominator may be evaluated by determining an initial value ($R_0$) from a look up table and then applying Eqn 13 to determine a more precise estimate ($R_1$):

$$R_1 = R_0(3-(x+c_k)R_0(3-(x+c_k)R_0) \quad \text{Equ 27}$$

The value for r in Eqns 24 to 26 is then given by:

$$r = 2(x-c_k)*R_1 \quad \text{Eqn 28}$$

The result of the Taylor series expansion is then added to the value for $\ln(c_k)$ that is derived from the look up table to determine the value of $\ln(x)$:

$$\ln(x) = \ln(c_k) + r + \frac{r^3}{12} \quad \text{Eqn 29}$$

The terms higher than $r^3$ are small enough that, for most purposes, they can be ignored.

Once $\ln(x)$ has been evaluated, a multiplication is optionally applied to determine the log in a different base. For example, to determine the log to the base 'a' of x, the following is applied:

$$\log_a(x) = \ln(x)*\log_a(e) \quad \text{Eqn 30}$$

Eqn 30 may, for example, be applied to determine $\log_2(x)$.

Figure 7A:
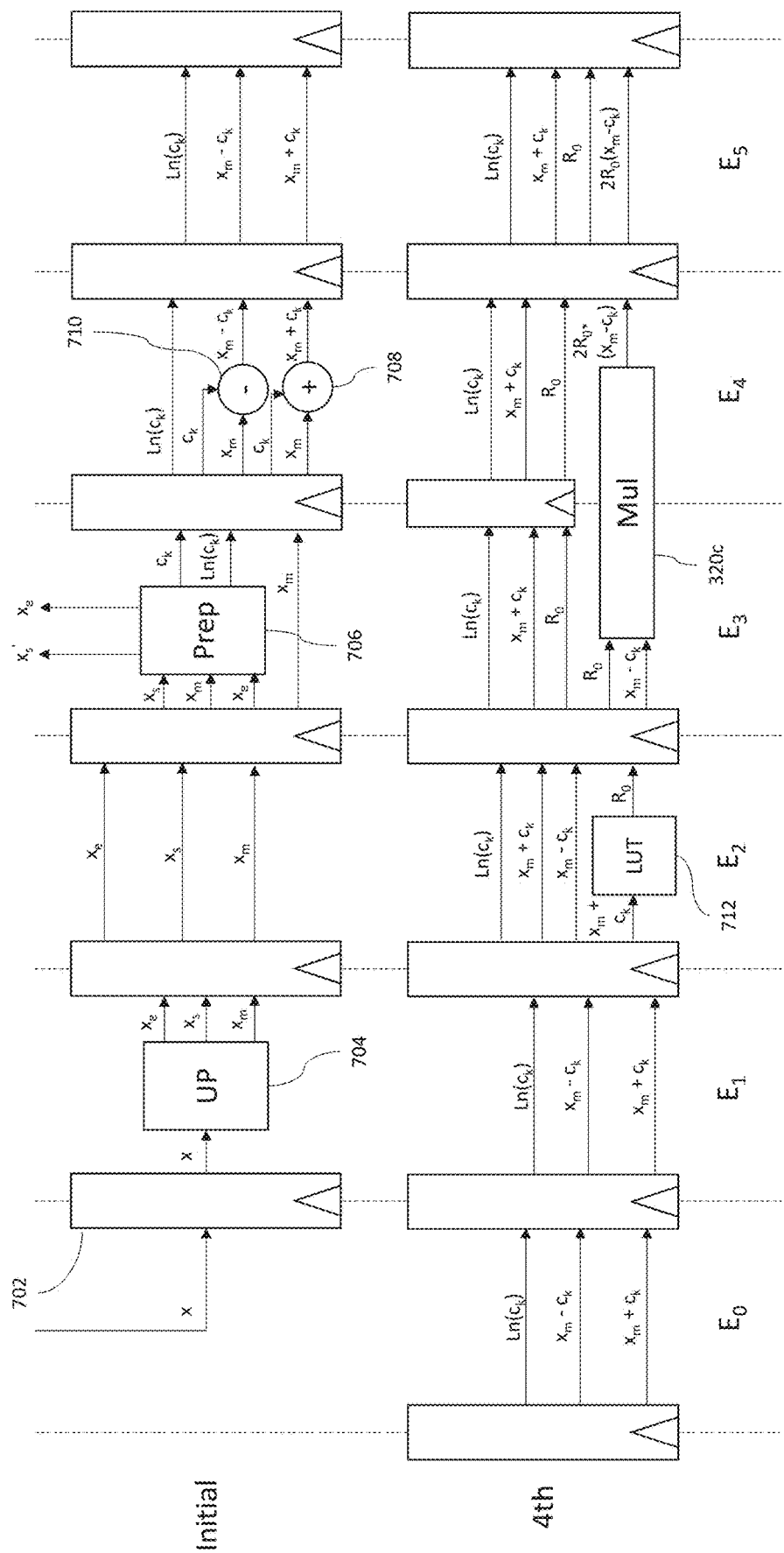
FIG. 7a illustrates the first two traversals of the processing pipeline for calculating a logarithm.

Reference is made to FIG. 7a, which illustrates the use of the pipeline 300 (or variations thereof) in the hardware module for evaluating the logarithm of an input value.

The execution unit is configured to execute an instruction comprising an op code and an operand. The op code indicates a logarithm that is to be evaluated by the execution unit. The operand is the input floating point number (x) of which the logarithm is to be determined. The input floating number (x) is provided to the pipeline of the execution unit. The input value (x) is received at the state element 702. The input value (x) is passed to the unpack circuit 704, which is configured to unpack the separate components, i.e. the sign bit ($x_s$), the exponent ($x_e$), and the mantissa ($x_m$) from the input value (x).

The components are received at the preparation circuit 706, which is configured to check the components to determine if the components take one or more special values. For example, if the sign bit ($x_s$) is negative then an error is flagged, irrespective of the values of the mantissa and exponent.

The preparation circuit 706 may also modify the sign component ($x_s$) in dependence upon the exponent and mantissa components. If x<1, then the logarithm result will be negative. Therefore, in this case the sign component ($x_s'$) for the result is set to be negative. This sign component ($x_s'$) will be packed with the calculated exponent and the calculated mantissa for the result, once, the pipeline has determined the mantissa of the result. If x>1, then the logarithm result will be positive, and the sign component ($x_s'$) remains unchanged from the input sign component ($x_s$).

The preparation circuit 706 is configured to determine based on the input range in which the input value falls, which method is to be applied to evaluate the logarithm. If $x < e^{1/16}$, then the hardware module is configured to evaluate the logarithm by evaluating the Taylor expansion given in Eqn 21. Otherwise, the hardware module is configured to evaluate the logarithm by evaluating the expression given by Eqn 22.

Figure 7B:
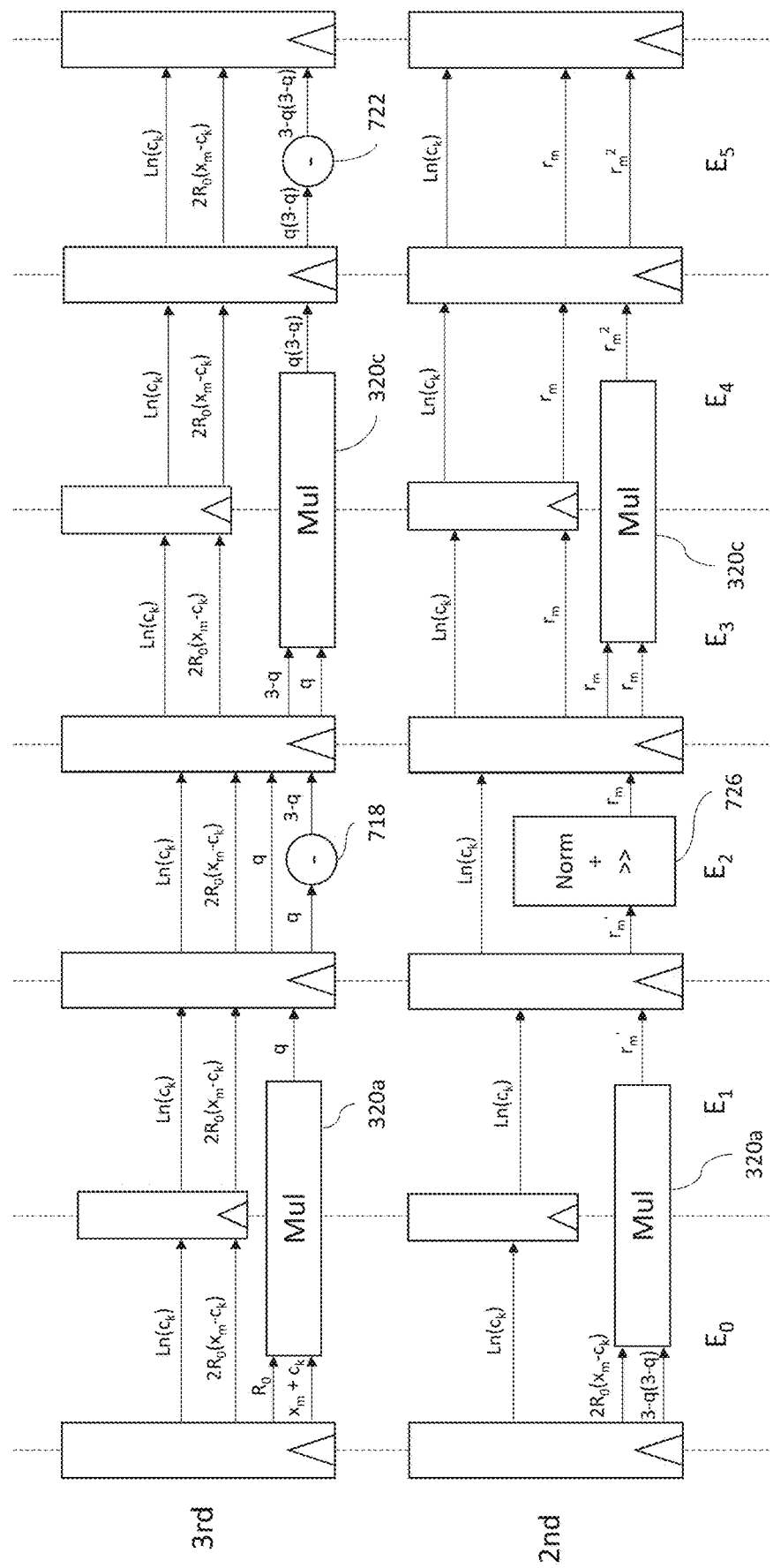
FIG. 7b illustrates the next two traversals of the processing pipeline for calculating a logarithm.
Figure 7C:
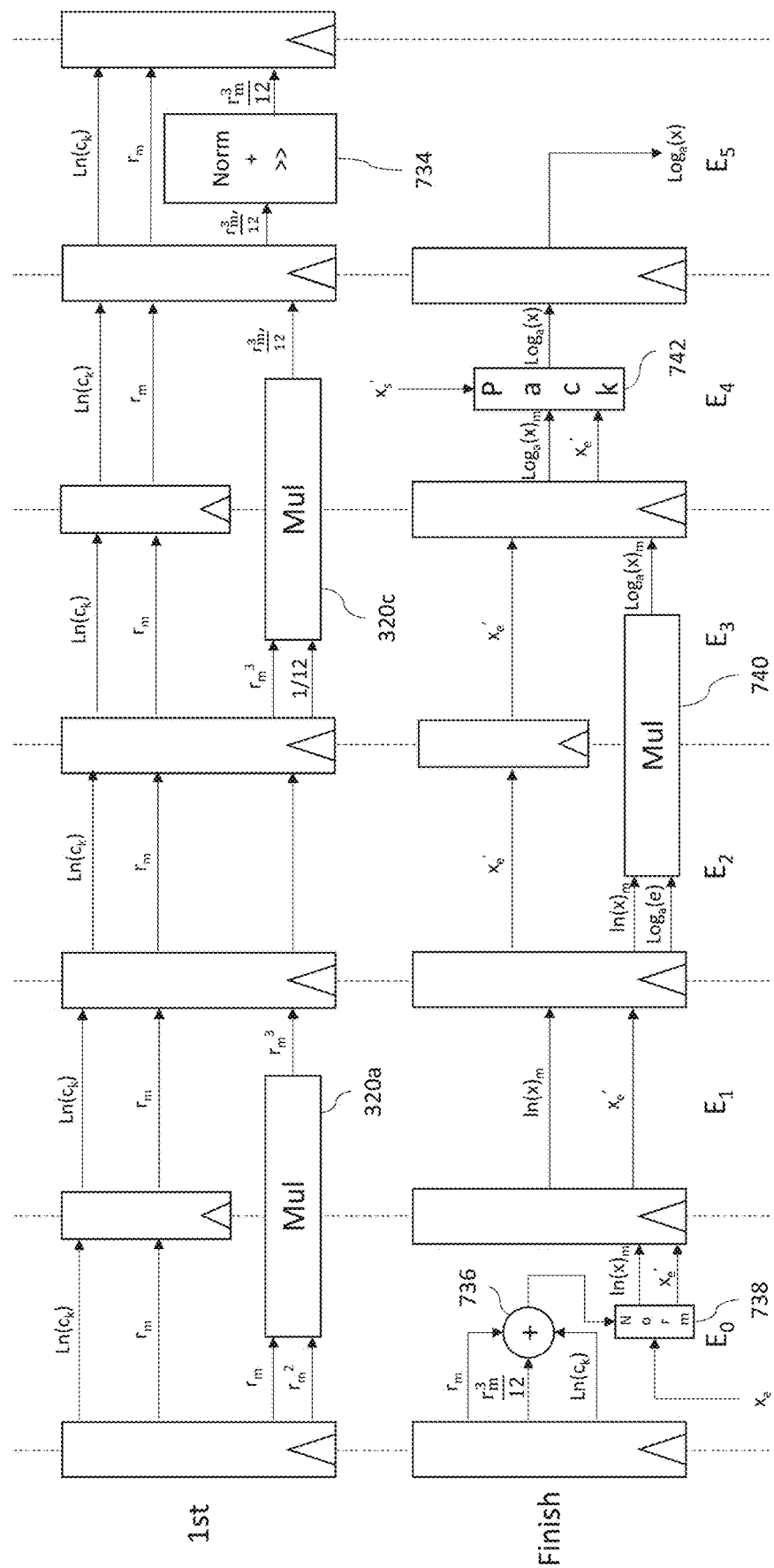
FIG. 7c illustrates the final two traversals of the processing pipeline for calculating a logarithm.

In the example illustrated in FIGS. 7a, 7b, and 7c, $x \geq e^{1/16}$ and therefore, the preparation circuit 706 determines that the method making use of the Taylor expansion in Eqn 21 is to be applied. The control circuitry 330 of the pipeline 300 configures the elements of the pipeline to apply this method to the input variables.

The preparation circuit 706 is configured determine based on the value of x, a value for k—and hence a value for $c_k$ given by Eqn 23 such that $$|x - c_k| \leq \frac{1}{128}.$$

When the value for k is determined, the corresponding value for $\ln(c_k)$ is loaded from a look up table of the preparation circuit 706. The preparation circuit is configured to use an index value (which may be either k or $c_k$) to locate the corresponding value of $\ln(c_k)$ from the look up table.

The mantissa ($x_m$) of the input value and the value of $c_k$ are provided to an addition circuit 708 that is configured to calculate the value of $x_m + c_k$. The mantissa ($x_m$) of the input value and the value of $c_k$ are also provided to the subtraction circuit 710 that is configured to calculate the value of $(x_m - c_k)$.

During the next traversal of the pipeline, the look up table 712 is configured to provide an estimate of the reciprocal of $x_m + c_k$. The value of $x_m + c_k$ is used to search the look up table 712 for an estimate for the reciprocal. A subset of bits of the value of $x_m + c_k$ are used as index to search the look up table from which the corresponding reciprocal estimate ($R_0$) is output.

The multiplier 320c is configured to multiply together $R_0$ with $(x_m - c_k)$ and the constant 2 to determine $2R_0(x_m - c_k)$.

Reference is now made to FIG. 7b, which illustrates the continuation of the process (which has so far been described with reference to FIG. 7a) for determining the logarithm of a floating point number.

The estimate ($R_0$) for the reciprocal value taken from the look up table is multiplied using multiplier 320a against $x_m + c_k$ to produce $R_0(x_m + c_k)$, which is labelled in FIGS. 7b and 7c as 'q'.

The subtraction circuit 718 is configured to subtract q from the number 3 to produce 3-q, which is provided to multiplier 320c. Multiplier 320c is configured to receive 3-q and q and multiply them to determine q(3-q).

The subtraction circuit 722 is configured to subtract q(3-q) from the number 3 to determine 3-q(3-q).

The multiplier circuit 320a is configured to multiply 3-q(3-q) with $2R_0(x_m - c_k)$ to calculate $r_m'$. $r_m'$ is the mantissa of the value for r in Eqns 24 to 26, prior to the normalisation and shift process.

It is seen that, together, the multipliers 320c, 320a, along with the subtraction circuits 718, 722 are configured to perform a second order Newton-Raphson iteration as indicated by Eqn 27, which enables $r_m'$ to be determined using Eqn 28.

Once the value $r_m'$ is determined, this is passed to the normalisation and shift circuit 726. This circuit 726 performs a shift of the mantissa $r_m'$ so as to correct for uncertainty regarding the position of the leading bit. This circuit 726 shifts the mantissa by, at most, 3 bits. The normalised mantissa is indicated by $r_m$.

The mantissa ($r_m$) of r is then passed to the multiplier 320c, which is configured to determine the square ($r_m^2$) of $r_m$.

Reference is now made to FIG. 7c, which illustrates the continuation of the process (which has so far been described with reference to FIGS. 7a and 7b) for determining the logarithm of a floating point number.

The multiplier 730 is configured to multiply the square ($r_m^2$) by $r_m$, to determine the cube ($r_m^3$) of the mantissa of r.

The multiplier 320c is configured to multiply the cube ($r_m^3$) of the mantissa of r by one twelfth to obtain $$\frac{r_{m\prime}^3}{12} \cdot \frac{r_{m\prime}^3}{12}$$

is the mantissa of the value for $$\frac{r^3}{12}$$

in Eqn 26, prior to the normalisation and shift process.

It is seen that, together, the multipliers 320a and 320c, are configured to determine from the value of r provided to them, the value of $$\frac{r^3}{12}$$

for use in the Taylor expansion given in Eqn 29.

The value of $$\frac{r_{m\prime}^3}{12}$$

is passed to the normalisation and shift circuit 734 that is configured to normalise and shift this mantissa value so as to align the exponent of $$\frac{r^3}{12}$$

with the exponent of r. The operation of cubing r will likely result in change to the exponent. However, the exponent is not modified by the multipliers, but only the mantissa is modified. To account for the change that would occur to the exponent, the mantissa $$\frac{r_{m\prime}^3}{12}$$

is shifted to be aligned with r. This shifting allows the addition of $$\frac{r_{m\prime}^3}{12}$$

and r carried out between the adder 736.

The at least one adder 736 is configured to add $$\frac{r_{m\prime}^3}{12},$$

$r_m$, and $\ln(c_k)$ together as in Eqn 29. The at least one adder 736 may be implemented as an adders taking three inputs and producing the result or as a set of two of adders, used to perform the overall addition. The result is the natural logarithm ($\ln(x_m)$) of the mantissa of x, which is provided to the normalisation circuit 738, which is configured to adjust this result from the adder 736 to produce the mantissa $(\ln(x)_m)$ of the natural logarithm of x. The normalisation circuit 738 uses the exponent ($x_e$) to calculate $x_e*\ln(2)$ using a constant multiplier. The value of $x_e*\ln(2)$ is added to the value derived from the addition circuit 736 to generate $\ln(x)_m$.

The normalisation circuit 738 is also configured to calculate the exponent ($x_e'$) of the result in dependence upon the normalisation applied to the mantissa $(\ln(x)_m)$ of the result.

$\ln(x)_m$ is received at the constant multiplier 740, which is configured to optionally convert the logarithm into a different base. The multiplier 740 receives $\ln(x)_m$ and multiplies it by $\log_a(e)$ to produce $\log_a(x)_m$. $\log_a(x)_m$ may be $\log_2(x)_m$. The length of the mantissa $(\ln(x)_m)$, which is provided in FP32 format (23 bits) is extended by multiplying the mantissa by a 33 bit value for $\log_a(e)$ to produce a 33 bit value for $\log_a(x)_m$. The normal mantissa length is 23 bits in FP32 format, but increasing the length of the mantissa to 33 bits gives better accuracy. The inventors have determined empirically that a mantissa length of 33 bits is a good trade-off between complexity and accuracy when calculating a logarithm function.

$\log_a(x)_m$ is passed to the pack circuit 742, which is configured to pack the components ($x_e$, $x_s$, $\log_a(x)_m$) into a floating point result, $\log_a(x)$. This result is output from the pipeline and provided to the worker thread that executed the instruction to generate the logarithm.

Figure 8:
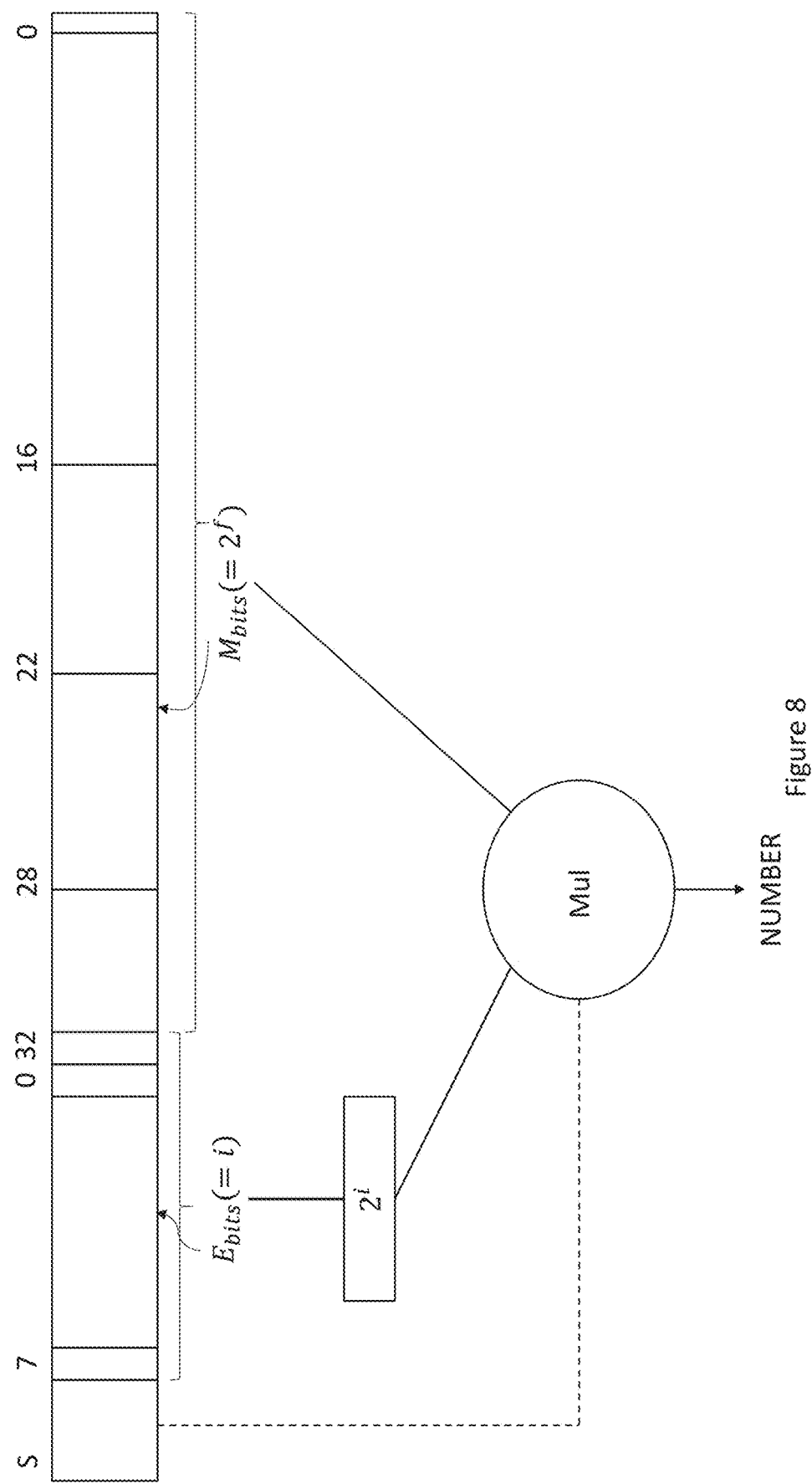
FIG. 8 illustrates the division of a power function into different components.

The processing pipeline 300 may be applied for evaluating exponential functions. Examples will now be described of the use of such a pipeline 300, or similar variations of such a pipeline, for evaluating exponential functions. The aim is to provide a result in floating point format of $e^x$, where x is an input value. The first step in using the multiplier configuration of FIG. 3 to evaluate the exponential function is to recognise certain properties of the floating point format, and its relationship to certain mathematical properties of exponential functions. Looking at FIG. 8, this represents a set of bits representing a number in the FP32 format, but with an expanded mantissa. The normal mantissa length is 23 bits in FP32 format, but increasing the length of the mantissa to 33 bits gives better accuracy. The inventors have determined empirically that a mantissa length of 33 bits is a good trade off between complexity and accuracy when calculating an exponential function. Bit S is the single sign bit. The E bits represent the exponential bits which denote an integer value. The M bits denote bits of the expanded mantissa. As explained already, there is a single sign bit and 8 exponential bits. The length of the mantissa is extended by multiplying the FP32 format mantissa (23 bits) by a 33 bit value for $\log_2(e)$.

In floating point format, the exponent bits are used as described in the background section. That is, when the number 2 is raised to the power of the exponent bits (minus the offset), and multiplied by the mantissa value then the number which is represented by the floating point format representation is given. By reorganising the exponential function such that it can be re-written as the product of two powers of two, it is possible to treat an integer part and a fractional part separately. This can be derived as shown:

$$e^x = e^{x \cdot \ln(2) \cdot \log 2(e)} \quad \text{Eqn 31}$$

$$e^x = e^{(i+f) \ln(2)} \quad \text{Eqn 32}$$

where $(i+f) = x \cdot \log 2(e)$. i is an integer and f is a fractional part $$e^x = e^{i \cdot \ln(2)} \cdot e^{f \cdot \ln(2)} \quad \text{Eqn 33}$$

$$e^x = 2^i \cdot 2^f \quad \text{Eqn 34}$$

Similarly, for base-2 exponentials ($2^x$), the following formula can be used to convert them: $2^x = e^{x \ln 2}$, such that they can similarly be approximated by the following techniques. Reverting to Eqn 31, the constant $\log_2(e)$ is used to pre-multiply the exponential with natural log, ln(2), so that the result can be split into two separate numbers, one which can represent the integer part and one which can represent the fractional part. The integer part i then forms the exponent of the result, and the fractional part may be split as will now be described. Returning to the FP format representation, the final value is given by $2^{[exP]} \times M$. Therefore, i represents the exponent in the floating point value. Thus, the exponent bits in the floating point representation of the exponential result are the binary representation of i. Therefore, it is not necessary to evaluate $2^i$ any further. The mantissa bits represent $2^f$, which must be evaluated.

To evaluate $2^f$, the f can be split into sub-components:

$$f = f_0 + f_1 + f_2 + f_3$$

Therefore, $2^f$ may be written as:

$$2^f = 2^{f_0} \cdot 2^{f_1} \cdot 2^{f_2} \cdot 2^{f_3}$$

Each of the separate components $f_0 \ldots f_3$ represents a bit slice of f. For example, for the following example value of f (by way of example only where f is 8 bits long), the respective components are indicated:

$$f = 11111111$$

$$f_0 = 11000000$$

$$f_1 = 00110000$$

$$f_2 = 00001100$$

$$f_3 = 00000011$$

A look up table or estimation is used to evaluate the separate components of $2^f$ In the above example, bit slices are each of the same length. However, the inventors have recognised that it can be particularly efficient to cause the bit slices to be of varying length, such that they can be handled by look up tables or estimation, depending on their significance.

What is needed is to generate an accurate value for $2^f$ each component f. An exponential can be represented as a Taylor Series as follows:

$$e^x = \frac{1+x}{1!} + \frac{x^2}{2!} + \frac{x^3}{3!} + \cdots \quad \text{Eqn 35}$$

Therefore, $2^f$ can be estimated as:

$$2^f = 1 + \frac{f \ln 2}{1!} + \frac{(f \ln 2)^2}{2!} + \cdots \quad \text{Eqn 36}$$

The series are infinite, but it will readily be appreciated that, for small values of x or f, the later components rapidly become vanishingly small.

The aim is to select a length of each bit slice such that look up tables can be efficiently stored and accessed, and conversely that if a slice is estimated, it can be done without loss of accuracy.

One aim therefore is to keep the highest order bit slice to be short, such that the look up table may contain a smaller number of entries, although each entry may be longer. Note that the length of an entry is governed amongst other things by the number of bits of precision that is used. In this example, 33 bits precision is utilised, and each entry in the look up table for the most significant bit slice constitutes 33 bits. If the length of the most significant bit slice is 4, as in the present example, the number of entries in the look up table is $2^4$ (16), and each entry has a length of 33 bits.

Note that for the next order bit slice, there is no need to store values for the bits preceding it in the mantissa. That is, the bits which correspond to the most significant bit slice would all be zeroes when considering the next order bit slice. Thus, the length of entries in the look up table for the next order bit slice is 33−4=29. If the second order bit slice is 5 bits long as in the present example, the number of entries is $2^5$, that is 32. Similarly, for the following next order bit slice, there is no need to store the leading zeroes and so the number of bits in each entry is 33−9 (24). If the number of bits in the bit slice is 7, the number of entries in the look up table is $2^7$ (128). Thus, by varying the length of the bit slices in this way, the look up tables can be sized to select the number of entries and the length of the entries in the most appropriate way.

Note that the above numbers are exemplary only, other arrangements are possible, and it is also possible that two or more of the leading order bit slices have the same length.

When considering the least significant bits slice, based on 33 bit precision, the 17 bits of this bit slice represent a value which when expanded by the Taylor series would be such that any terms beyond the first order would exceed the precision length. It is therefore possible to calculate this term in the first order (1+f ln2) rather than utilising a look up table and still achieve the necessary accuracy parameters. The length of the least significant bit slice may be half the total length of the expanded mantissa (e.g. 16 or 17 bits long)—its length is governed by the extent to which its estimate 1+f ln2 is accurate within the given precision.

Figure 9B:
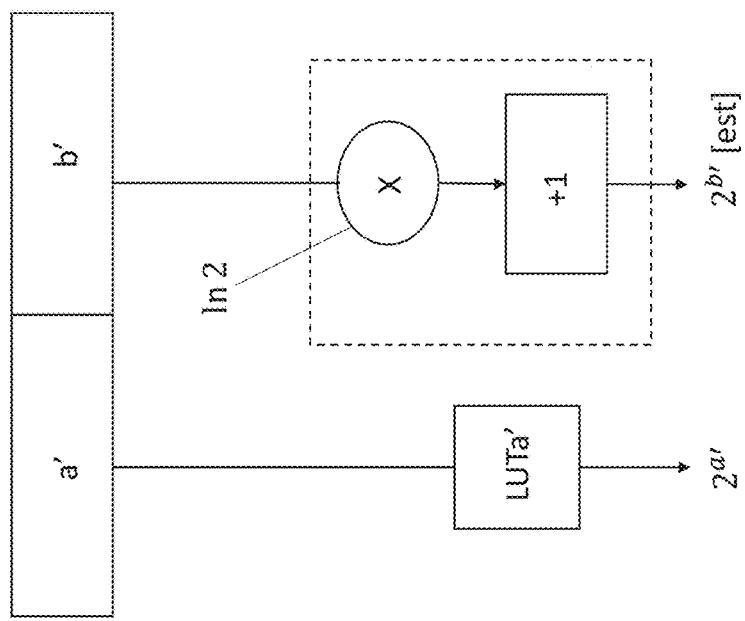
FIGS. 9a and 9b illustrate the evaluation of different components of a power function.
Figure 9A:
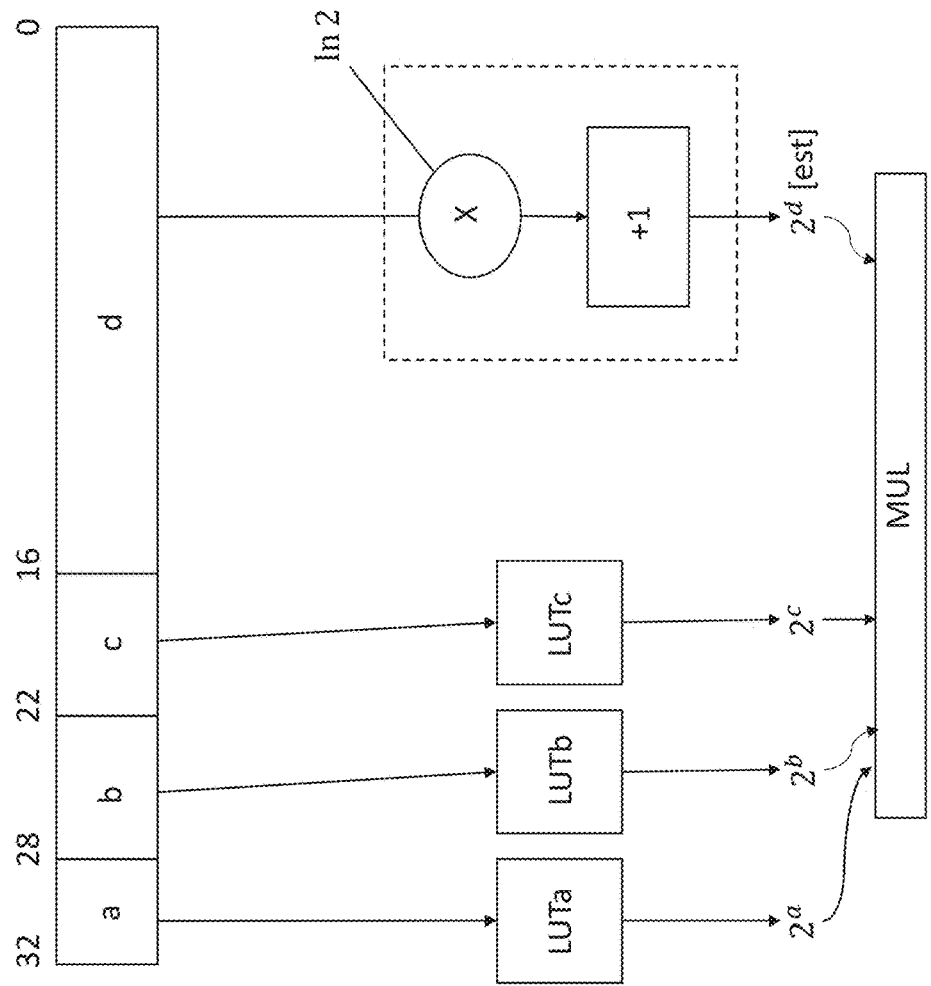

FIG. 9A shows four bit slices of the expanded mantissa $M_x[FP32]$ in one example, labelled as follows:
  a—bits 32 to 29
  b—bits 24 to 28
  c—bits 17 to 23
  d—bits 0 to 16

Three of these may be used to access a respective look up table as shown in FIG. 9A. Look up tables are labelled LUTa, LUTb and LUTc as associated with their input bit slices a, b, c respectively. In one example, look up table LUTa has 16 entries, LUTb has 32 entries and LUTc has 128 entries each. As explained above, each entry is a value which is $2^y$, where y represents the value of the bit slice fed to that look up table.

The least significant component ($f_c$) is calculated as:

$$2^{f_c} = 1 + f_c \cdot \ln(2)$$ Eqn 37

The look up tables may be used to evaluate all but the smallest of the components (i.e. $f_3$ in the above example). $f_3$ may then be determined using Equation 37 as shown above.

The separate components are then multiplied together using the processing pipeline according to embodiments of the application to obtain a value for $2^f$. Therefore, a mantissa value $2^f$ is obtained for the exponential result ($e^x$) of input value x in addition to the exponent.

Figure 10:
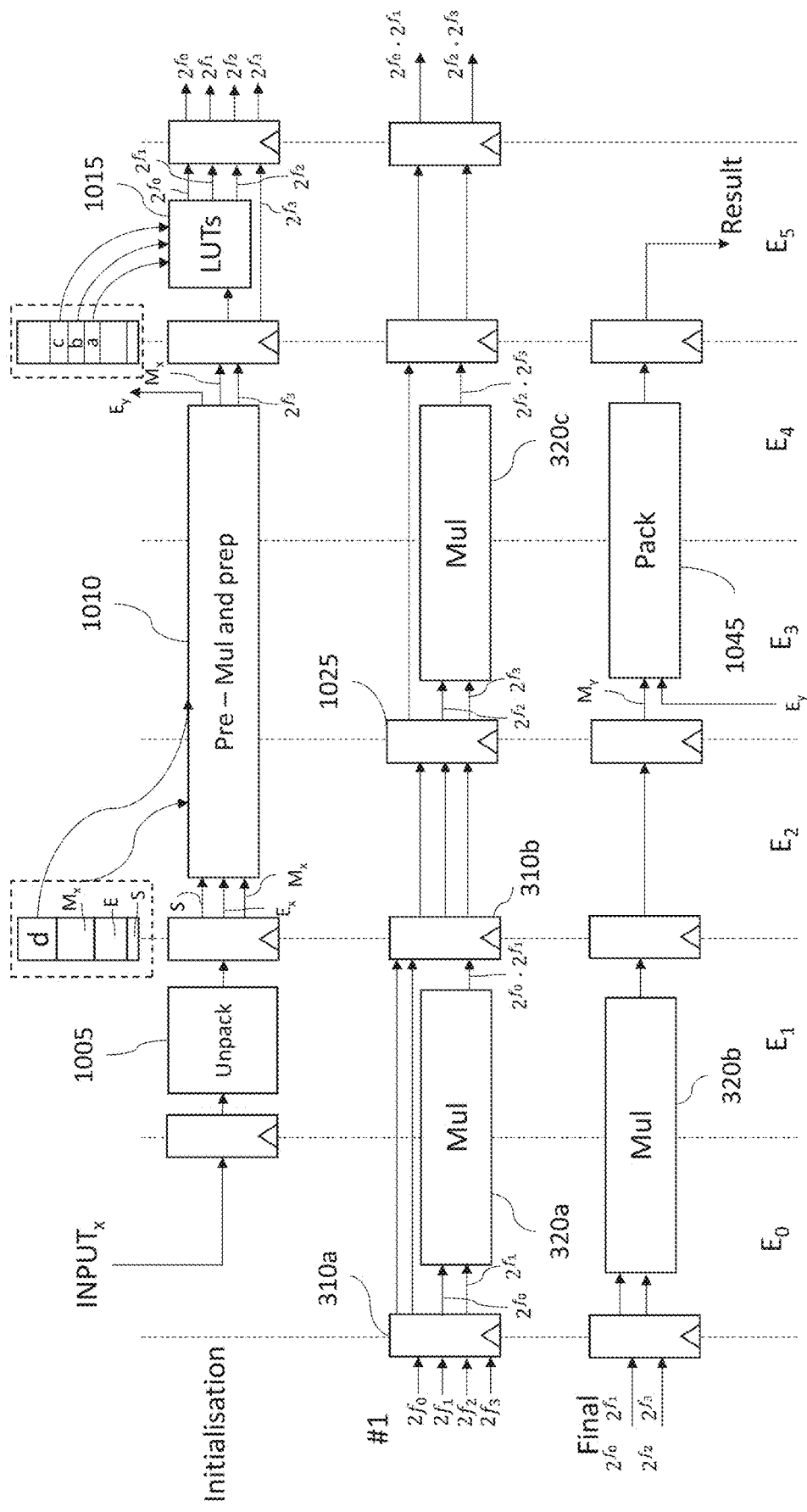
FIG. 10 illustrates the first three traversals of the processing pipeline for calculating an exponential function.

Reference is made to FIG. 10, which illustrates the use of a processing pipeline according to embodiments of the application for evaluating an exponential function. This example may be used for evaluating an exponential function of a single-precision floating point number.

The input number is extracted from a computer instruction which has an opcode defining the exponential function and an operand which is, or points to, the input number. The hardware module is configured to provide the number to the processing pipeline just prior to the second stage $E_1$ of processing. Therefore, the number skips a first stage of processing during an initialisation run through the pipeline. During the initialisation run through of the pipeline, the number is delivered first to unpack circuitry 1005, which is configured to unpack the exponent Ex, mantissa Mx, and sign bit Sx from the input floating point number x. The unpacked parts of the number are then delivered to a pre-multiplier and preparation circuity 1010. The pre-multiplier and preparation circuitry 1010 determines from the number an integer part and a fractional part. That is, the pre-multiplier and preparation circuit determines $x.\log_2 e$ to generate i+f, and then determines i as the largest integer leaving only f, the fractional component. The binary representation of i forms the exponent Ey of the result value, which is stored in a register until the final pass of the pipeline. The fractional part must be evaluated, as discussed above, in order to determine the mantissa of the result. The pre-mul and prep circuitry 1010 may also evaluate the least significant component $2^{f_3}$ of the fractional part using Equation 37 as shown above, from bits 0 to 16 of the expanded mantissa.

In order to evaluate the fractional part, the bit slices a, b, c are passed to at least one look up tables LUTa, b, c in block 1015. The hardware module is configured to access from the look up tables 1015, the entry for each of the plurality of components $2^{f_0}$, $2^{f_1}$, $2^{f_2}$ of the fractional part.

The different evaluated components (i.e. $2^{f_c}$) are held in a register, ready to be further processed by the pipeline.

The different evaluated components of the fractional part are then processed together using the processing pipeline of multipliers. In this example, the multipliers are applied in series only and multiplication takes place over two runs through the pipeline. However, in other examples, two or more of the multipliers may be arranged in parallel (as illustrated in the example of FIG. 3) so as to perform the multiplications of different components of the fractional part in parallel.

As shown, at the pipeline pass #1 of the pipeline, two of the evaluated components $2^{f_0}$, $2^{f_1}$ are provided to the multiplier 320a, which is configured to multiply these two components together and to output the result of the multiplication. The pipeline multiplexers are controlled to cause the result of the multiplication at multiplier 320a to bypass multiplier 320c and be delivered onwards to the end of the pipeline.

The other two evaluated components $2^{f_2}$, $2^{f_3}$ are switched to bypass multiplier 320a and to arrive at latch 1025. These components are input to multiplier 320c, which multiplies these two components together and outputs the results of the multiplication. The results from the two multiplications during the pipeline pass #1 are then stored in a register ready for a final run through the pipeline.

The results from the multiplications performed by multipliers 320a and 320c are passed to multiplier 320b, which is configured to multiply together these two results to obtain a mantissa My for the output value for the exponential function. The mantissa is then provided to a packing circuit 1045. The packing circuit 1045 is configured to take the mantissa My resulting from the multiplication at multiplier 320b and pack it with the exponent Ey determined by the pre-multiplier and prep circuit 1010 to determine a floating point representation for the exponential result ($e^x$).

Although the present example describes splitting the fractional part into four components (four bit slices of the input mantissa), it will be appreciated that other numbers of components may be used. A larger number of components requires a greater number of multiplications to be carried out, but reduces the necessary size of the look up table/s. A smaller number of components requires larger look up tables, but reduces the number of multiplications that must be carried. There exists a trade off between these considerations. Moreover, at least some of the bit slices may have differing lengths, which enables a further optimisation of the trade-off between the size of the look up tables and the number of multiplications, without compromising on accuracy.

Figure 11:
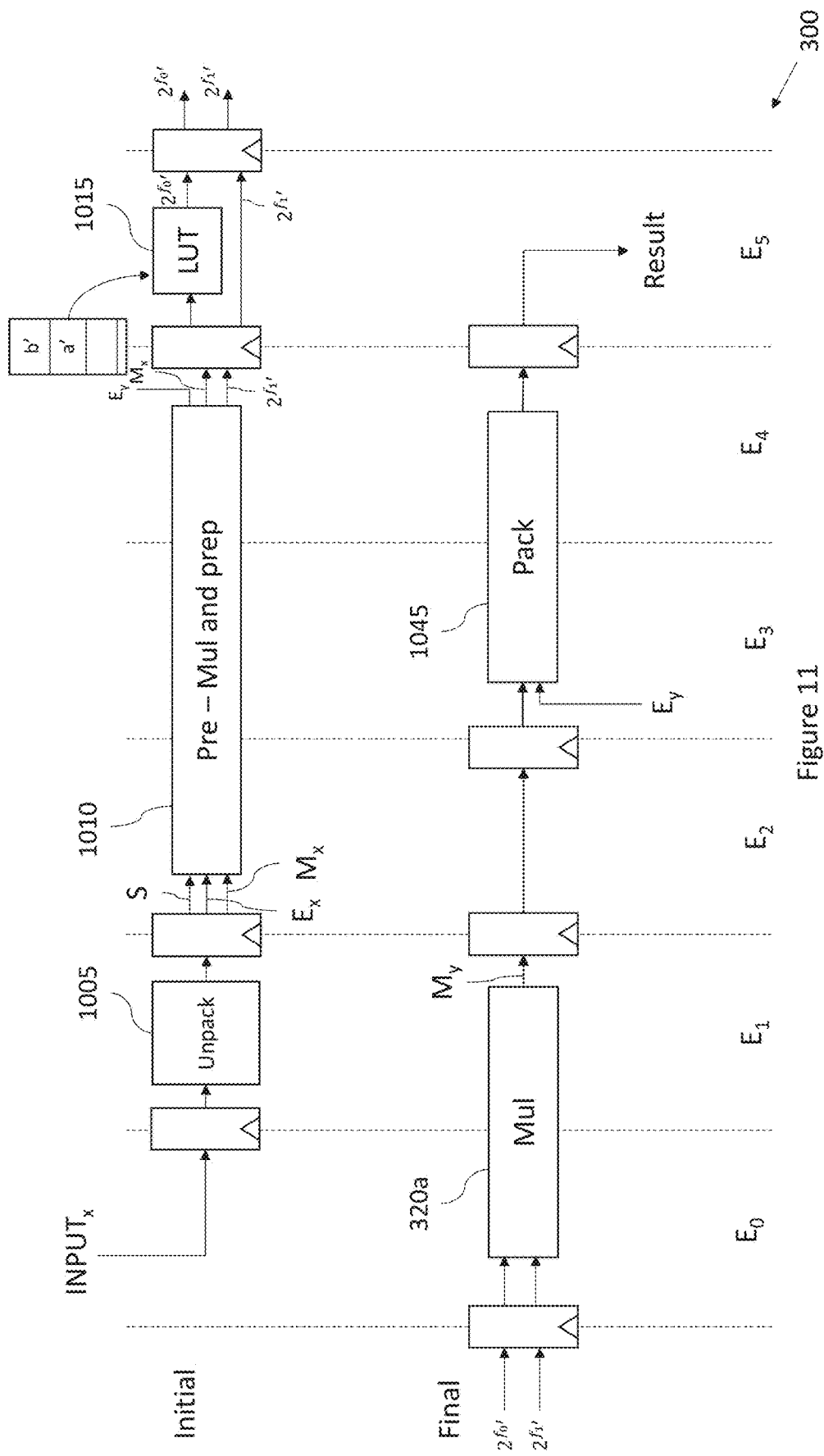
FIG. 11 illustrates the final two traversals of the processing pipeline for calculating an exponential function.

Reference is made to FIG. 11, which illustrates the use of a processing pipeline according to embodiments of the application for evaluating an exponential function of a half-precision floating point number.

The input x is extracted by the hardware module (from the instruction itself or from memory or a register). The hardware module is configured to provide the number to the processing pipeline just prior to the second stage $E_1$ of processing. Therefore, the number skips a first stage of processing during the initialisation run through the pipeline. During the initialisation run through of the pipeline, the number is delivered first to the unpack circuitry 1005, which is configured to unpack the exponent Ex, mantissa Mx, and sign bit Sx from the input floating point number. The number is then delivered to pre-multiplier and preparation circuity 1010. The pre-multiplier and the preparation circuitry 1010 determines from the number, an integer part (corresponding to the exponent of the result Ey, as discussed above) and a fractional part. The fractional part must be evaluated, as discussed above, in order to determine the mantissa of the result. The pre-multiplier and prep circuitry 1010 may evaluate one or more components of the fractional part using Equation 37 as shown above.

In order to evaluate the fractional part, the fractional component a' is passed to a look up table in block 1015. The hardware module is configured to access from the look up table 1015, the entry for component a' of the fractional part. In the case of a half-precision floating point number, the fractional part may be divided into only two components, corresponding to two bit slices a', b' of the mantissa Mx. The look up table LUT a' may be used to evaluate only one of these components $2^{f_0'}$, with the remaining component $2^{f_1'}$ being evaluated using Equation 37 given above. FIG. 9B shows operation to generate the fractional components in half precision floating point. Note that the mantissa has been extended to a greater number of bits than normal FP16 precision (in this case 23 bits). This can be achieved by using a value for $\log_2(e)$ of a suitable length (e.g. 23 bits), as in the case of the FP32 example.

The evaluated components (i.e. $2^{fe}$) are shared in a register, ready to be further processed by the pipeline.

In this example, there are only two evaluated components and so only a single multiplier 320a is used to multiply these components together to produce the mantissa My of the function result. The mantissa is then provided to the packing circuit 1045. The packing circuit 1045 is configured to take the mantissa resulting from the multiplication at multiplier 320a and pack it with the exponent Ey determined by the pre-mul and prep circuit 1010 to determine a floating point result for the mantissa.

Therefore, the hardware module described comprising the processing pipeline 300 (or variations thereof) is configured in response to the execution of suitable instructions by an execution unit to evaluate exponential, logarithm, division, and square root function as described. The hardware module is part of the execution unit and is configured to perform the calculations of the function in response to the execution of an appropriate instruction by a thread of the execution unit.

Figure 12:
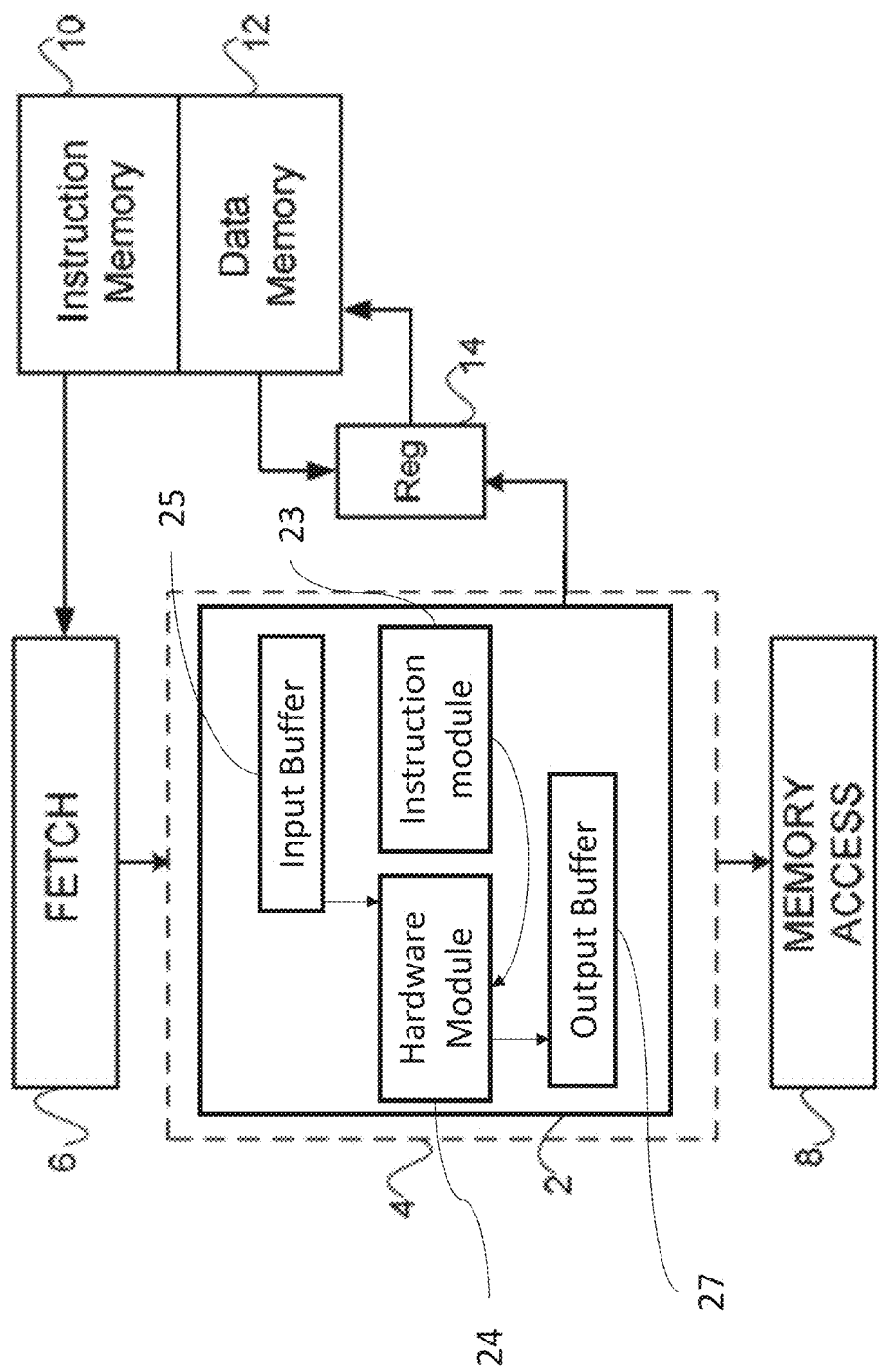
FIG. 12 is a schematic diagram illustrating a processor having an execution unit for evaluating a plurality of mathematical functions.

Reference is made to FIG. 12, which illustrates an example of the use of such a hardware module 24 for performing the evaluation of functions in an execution pipeline of a processor. FIG. 12 shows a schematic block diagram of an execution unit 2 arranged to execute an instruction to evaluate a function, such as an exponential, logarithm, divide or square root. The instruction is executed by a worker thread, as described above with reference to FIG. 2.

The execution unit 2 forms part of a pipeline 4 in a processing unit. The processing unit comprises an instruction fetch unit 6 which fetches instruction from an instruction memory 10. The processing unit also comprises a memory access stage 8 which is responsible for accessing a data memory 12 for loading data from the memory or storing data into the memory. A set of registers 14 is provided for holding source and destination operands for the instructions being executed at any instance by the execution pipeline 4. It will readily be understood that the execution pipeline 4 may contain many different types of execution unit for executing a variety of different instructions, for example for performing mathematical operations. The processing unit may be configured to execute a plurality of concurrent worker threads that are each allocated time periods by a supervisor thread.

The execution unit 2 comprises an instruction execution module 23 and an output buffer 27 for holding the result of execution of the instruction. The instruction execution module 23 is configured to execute an instruction to cause the hardware module 24 to evaluate a function of one or more input values. The instruction contains an op code that specifies the function to be evaluated by the hardware module 24. The instruction also contains at least one operand with respect to which the function is to be performed. When the instruction is executed, the execution unit supplies to the hardware module 24, the at least one operand and control information dependent upon the op code that causes the hardware module 24 to evaluate the function for the at least one operand. The hardware module receives the control information, which is used to control the multiplexors of the processing pipeline so as to implement the function specified by the op code using the multipliers and additional processing circuitry of the pipeline.

The one or more input values for the function are provided as an operand of the executed instruction. The hardware module 24 is configured in response to such an instruction to read one or more input values from the input buffer 25. The hardware module 24 then provides the result/s of the function in the output buffer 27.

It will be appreciated that the embodiments described are by way of non-limiting examples only, and that variations within the scope of the claims may be envisaged. In one variation, while the examples have been given in the context of floating point numbers of single precision and half precision formats, the technique may readily be adapted to floating point formats of different precisions.

What is claimed is:

1. An execution unit for a processor, the execution unit configured to receive from a computer readable instruction an op code defining the nature of the instruction and to access one or more operands defined by the instruction, wherein the op code defines that the instruction evaluates a function of one or more input values provided by one or more operands to produce a function result, the one or more operands being in floating point format, the execution unit comprising:
    a look up table having a plurality of entries, each of the plurality of entries comprising an initial estimate for a result of an operation;
    a preparatory circuit configured to search the look up table using an index value dependent upon the one or more operands to locate an entry of the plurality of entries comprising a first initial estimate for a result of the operation when performed on at least one of the one or more operands;
    a plurality of processing circuits comprising at least one multiplier circuit; and
    control circuitry configured to provide the first initial estimate to the at least one multiplier circuit of the plurality of processing circuits so as to perform processing, by the plurality of processing circuits, of the first initial estimate to generate the function result, said processing comprising:
    applying one or more Newton Raphson iterations to the first initial estimate to determine a preliminary function result;
    applying a reversal of the function to the preliminary function result to determine an error in the preliminary function result, including performing a subtraction between a first one of the input values and an approximation of the first one of the input values generated from the preliminary function result; and
    performing rounding of one or more bits of the preliminary function result in dependence upon the determined error, including applying a unit in the last place (ULP) circuit to determine a ULP.

2. An execution unit as claimed in claim 1, wherein the plurality of processing circuits comprises:
    an addition circuit configured to add together two or more values to generate an addition result; and
    a subtraction circuit, which is configured to perform the subtraction.

3. An execution unit as claimed in claim 1, wherein the processing comprises applying the one or more Newton Raphson iterations to the first initial estimate to determine an estimate of improved precision for the result of the operation on at least one of the one or more operands, and
    processing the estimate of improved precision to generate the function result.

4. An execution unit as claimed in claim 1, wherein the function is a divide function and the at least one operand comprises a numerator and denominator of the divide function.

5. An execution unit as claimed in claim 4, wherein the index value comprises at least part of the denominator.

6. An execution unit as claimed in claim 4, wherein the first initial estimate is an estimate of the reciprocal of the denominator.

7. An execution unit as claimed in claim 4, wherein the first initial estimate is an estimate of the reciprocal of the denominator, wherein the at least one multiplier circuit is configured to perform the processing of the estimate of improved precision to generate the function result by multiplying the estimate of improved precision by the numerator.

8. An execution unit as claimed in claim 1, wherein the function is a square root function of a first operand of the at least one operand.

9. An execution unit as claimed in claim 8, wherein the index value comprises at least part of the first operand.

10. An execution unit as claimed in claim 8, wherein the first initial estimate is an estimate of the reciprocal of the square root of the first operand.

11. An execution unit as claimed in claim 8, wherein the first initial estimate is an estimate of the reciprocal of the square root of the first operand, wherein the at least one multiplier circuit is configured to perform the processing of the estimate of improved precision to generate the function result by multiplying the estimate of improved precision by the first operand.

12. An execution unit as claimed in claim 1, wherein the execution unit comprises:
a processing pipeline comprising the plurality of processing circuits, where the at least one multiplier circuit comprises a plurality of multiplier circuits, wherein the processing pipeline is operable to evaluate a plurality of different functions; and
control circuitry configured to, in dependence upon the op code of the instruction, control multiplexers of the processing pipeline so as to control to which of the multiplier circuits of the pipeline, values from a preceding processing stage of the pipeline are directed so as to evaluate the function defined by the op code, wherein the evaluation of the function defined by the op code comprises the control circuitry providing the first initial estimate to one or more of the multiplier circuits so as to perform the processing of the first initial estimate to generate the function result.

13. A method of operating an execution unit in a processor, the method comprising:
receiving from a computer readable instruction, an op code defining a nature of the instruction;
accessing one or more operands defined by the instruction, wherein the op code defines that the instruction evaluates a function of the one or more operands to produce a function result, the one or more operands including one or more input values in floating point format;
storing, in a look up table, a plurality of entries, each of the plurality of entries comprising an initial estimate for a result of an operation;
searching the look up table using an index value dependent upon the one or more operands to locate an entry of the plurality of entries comprising a first initial estimate for a result of the operation when performed on at least one of the one or more operands;
providing the first initial estimate to at least one multiplier circuit of a plurality of processing circuits so as to perform processing, by the plurality of processing circuits, of the first initial estimate to generate the function result, said processing comprising:
applying one or more Newton Raphson iterations to the first initial estimate to determine a preliminary function result;
applying a reversal of the function to the preliminary function result to determine an error in the preliminary function result, including performing a subtraction between a first one of the input values and an approximation of the first one of the input values generated from the preliminary function result; and
performing rounding of one or more bits of the preliminary function result in dependence upon the determined error, including applying a unit in the last place (ULP) circuit to determine a ULP.

14. The method of claim 13, wherein the function is a divide function and the at least one operand comprises a numerator and denominator of the divide function.

15. The method of claim 14, wherein the index value comprises at least part of the denominator.

16. The method of claim 14, wherein the first initial estimate is an estimate of the reciprocal of the denominator.

17. The method of claim 14, wherein the first initial estimate is an estimate of the reciprocal of the denominator, wherein the at least one multiplier circuit is configured to perform the processing of the estimate of improved precision to generate the function result by multiplying the estimate of improved precision by the numerator.

18. The method of claim 13, wherein the function is a square root function of a first operand of the at least one operand.

19. The method of claim 18, wherein the index value comprises at least part of the first operand.

20. An execution unit for a processor, the execution unit configured to receive from a computer readable instruction an op code defining the nature of the instruction and to access one or more operands defined by the instruction, wherein the op code defines that the instruction evaluates a function of one or more operands to produce a function result, the one or more operands being in floating point format, the execution unit comprising:
a look up table having a plurality of entries, each of the plurality of entries comprising an initial estimate for a result of an operation;
a preparatory circuit configured to search the look up table using an index value dependent upon the one or more operands to locate an entry of the plurality of entries comprising a first initial estimate for a result of the operation when performed on at least one of the one or more operands;
a processing pipeline comprising a plurality of processing circuits comprising a plurality of multiplier circuits, wherein the processing pipeline is operable to evaluate a plurality of different functions; and
control circuitry configured to, in dependence upon the op code of the instruction, control multiplexers of the processing pipeline so as to control to which of the multiplier circuits of the pipeline, values from a preceding processing stage of the pipeline are directed so as to evaluate the function defined by the op code, wherein the evaluation of the function defined by the op code comprises the control circuitry providing the first initial estimate to at least one of the multiplier circuits so as to perform processing, by the plurality of processing circuits, of the first initial estimate to generate the function result, said processing comprising applying one or more Newton Raphson iterations to the first initial estimate.

21. A method of operating an execution unit in a processor, the execution unit comprising a processing pipeline comprising a plurality of processing circuits comprising a plurality of multiplier circuits, wherein the processing pipeline is operable to evaluate a plurality of different functions, the method comprising:

receiving from a computer readable instruction, an op code defining the nature of the instruction;

accessing one or more operands defined by the instruction, wherein the op code defines that the instruction evaluates a function of the one or more operands to produce a function result, the one or more operands being in floating point format;

storing, in a look up table, a plurality of entries, each of the plurality of entries comprising an initial estimate for a result of an operation;

searching the look up table using an index value dependent upon the operand to locate an entry of the plurality of entries comprising a first initial estimate for a result of the operation when performed on at least one of the one or more operands; and in dependence upon the op code of the instruction, controlling multiplexers of the processing pipeline so as to control to which of the multiplier circuits of the pipeline, values from a preceding processing stage of the pipeline are directed so as to evaluate the function defined by the op code, wherein the evaluation of the function defined by the op code comprises providing the first initial estimate to the at least one multiplier circuit of the plurality of processing circuits so as perform processing, by the plurality of processing units, of the first initial estimate to generate the function result, said processing comprising applying one or more Newton Raphson iterations to the first initial estimate.

* * * * *